US012649164B2

(12) United States Patent
Choi et al.

(10) Patent No.: US 12,649,164 B2
(45) Date of Patent: Jun. 9, 2026

(54) BUFFER CHAMBER, SUBSTRATE TREATING APPARATUS AND SUBSTRATE TREATING METHOD

(71) Applicant: SEMES CO., LTD., Cheonan-si (KR)

(72) Inventors: Jun Young Choi, Cheongju-si (KR); Gui Su Park, Cheonan-si (KR); Young Hun Lee, Cheonan-si (KR); Young Jin Jang, Cheonan-si (KR); Jun Hyun Lim, Seoul (KR)

(73) Assignee: SEMES CO., LTD., Cheonan-si (KR)

( * ) Notice: Subject to any disclaimer, the term of this patent is extended or adjusted under 35 U.S.C. 154(b) by 612 days.

(21) Appl. No.: 18/097,408

(22) Filed: Jan. 16, 2023

(65) Prior Publication Data

US 2023/0415191 A1 Dec. 28, 2023

(30) Foreign Application Priority Data

Jun. 24, 2022 (KR) ........................ 10-2022-0077421

(51) Int. Cl.

*B05C 3/10* (2006.01)
*B08B 3/04* (2006.01)
*B08B 3/08* (2006.01)
*B08B 3/10* (2006.01)

(52) U.S. Cl.

CPC ................ *B05C 3/10* (2013.01); *B08B 3/041* (2013.01); *B08B 3/08* (2013.01); *B08B 3/10* (2013.01)

(58) Field of Classification Search

None

See application file for complete search history.

(56) References Cited

U.S. PATENT DOCUMENTS 5,826,601 A * 10/1998 Muraoka ............. C03C 23/0095 134/102.1
8,027,017 B2 * 9/2011 Ryu .................. H01L 21/67057 355/30
8,652,268 B2 * 2/2014 Hayashi ............ H01L 21/67023 134/96.1
9,437,464 B2 * 9/2016 Hayashi ............ H01L 21/67057
9,460,944 B2 * 10/2016 Fujiwara ........... H01L 21/67253
10,276,406 B2 * 4/2019 Hayashi ............ H01L 21/67028
10,395,916 B2 * 8/2019 Wu ........................ H01L 21/768
10,406,566 B2 * 9/2019 Matsushita ............... B08B 3/08
10,460,923 B2 * 10/2019 Kim .................. H01L 21/68764
10,541,161 B2 * 1/2020 Jung ................. H01L 21/67017
10,586,720 B2 * 3/2020 Weaver ............. H01L 21/68707
10,682,674 B2 * 6/2020 Jung .................. H01L 21/6715
10,758,875 B2 * 9/2020 Bang .......................... B05B 1/34

(Continued)

FOREIGN PATENT DOCUMENTS

JP 2022016347 1/2022
JP 2022057884 4/2022

(Continued)

*Primary Examiner* — Jethro M. Pence

(57) ABSTRACT

The inventive concept provides a substrate treating apparatus. The substrate treating apparatus includes a batch-type treating bath for treating a substrate in a batch-type manner; a single-type treating chamber for treating the substrate in a single-type manner; and a buffer chamber positioned on a transfer path of the substrate transferred between the batch-type treating bath and the single-type treating chamber, and supplying a liquid for maintaining a wetting state of the substrate.

12 Claims, 26 Drawing Sheets

(56) References Cited

U.S. PATENT DOCUMENTS

| | | | | |
|---|---|---|---|---|
| 10,969,700 | B2 * | 4/2021 | Park | G03F 7/3021 |
| 11,097,320 | B2 * | 8/2021 | Park | H01L 21/67051 |
| 11,149,234 | B2 * | 10/2021 | Park | C11D 3/32 |
| 11,621,159 | B2 * | 4/2023 | Kim | B08B 3/08 134/30 |
| 11,684,956 | B2 * | 6/2023 | Jeong | B08B 3/10 134/99.1 |
| 11,721,565 | B2 * | 8/2023 | Choi | B08B 3/08 156/345.11 |
| 11,868,057 | B2 * | 1/2024 | Shibasaki | H01L 21/6715 |
| 11,923,219 | B2 * | 3/2024 | Choi | B08B 13/00 |
| 12,154,796 | B2 * | 11/2024 | Park | H01L 21/02101 |
| 12,237,180 | B2 * | 2/2025 | Choi | H01L 21/67178 |
| 12,266,561 | B2 * | 4/2025 | Lee | B08B 11/02 |
| 2003/0053893 | A1 * | 3/2003 | Matsunaga | C23C 16/54 414/217 |
| 2004/0112410 | A1 * | 6/2004 | Araki | B08B 3/048 134/186 |
| 2005/0115671 | A1 * | 6/2005 | Araki | H01L 21/31116 257/E21.228 |
| 2006/0156979 | A1 * | 7/2006 | Thakur | C23C 16/45546 438/476 |
| 2008/0060681 | A1 * | 3/2008 | Choo | B08B 3/10 134/105 |
| 2008/0230101 | A1 * | 9/2008 | Hayashi | B08B 3/048 134/57 R |
| 2010/0173495 | A1 * | 7/2010 | Thakur | H01L 21/67115 438/785 |
| 2012/0210937 | A1 * | 8/2012 | Thakur | C23C 16/54 118/725 |
| 2016/0351385 | A1 * | 12/2016 | Kim | H01L 21/67051 |
| 2018/0090340 | A1 * | 3/2018 | Sugioka | H01L 22/20 |
| 2019/0385838 | A1 * | 12/2019 | Wu | H01L 21/02074 |
| 2020/0027761 | A1 * | 1/2020 | Park | H01L 21/6838 |
| 2021/0202271 | A1 * | 7/2021 | Choi | H01L 21/67034 |
| 2022/0013393 | A1 * | 1/2022 | Jung | H01L 21/67742 |
| 2022/0088644 | A1 * | 3/2022 | Oh | B08B 3/08 |

FOREIGN PATENT DOCUMENTS

| | | |
|---|---|---|
| JP | 2022087065 | 6/2022 |
| JP | 2022178486 | 12/2022 |
| KR | 10-2001-0112512 | 12/2001 |
| KR | 10-2008-0051079 | 6/2008 |
| KR | 10-2009-0097377 | 9/2009 |
| KR | 10-2011-0120709 | 11/2011 |
| KR | 10-2015-0097390 | 8/2015 |
| KR | 10-2016-0147162 | 12/2016 |
| KR | 10-2018-0039200 | 4/2018 |
| KR | 10-2022-0076279 | 6/2022 |

* cited by examiner

10B

BUFFER CHAMBER, SUBSTRATE TREATING APPARATUS AND SUBSTRATE TREATING METHOD

CROSS-REFERENCE TO RELATED APPLICATIONS

A claim for priority under 35 U.S.C. § 119 is made to Korean Patent Application No. 10-2022-0077421 filed on Jun. 24, 2022, in the Korean Intellectual Property Office, the entire contents of which are hereby incorporated by reference.

BACKGROUND

Embodiments of the inventive concept described herein relate to a buffer chamber, a substrate treating apparatus and a substrate treating method.

In order to manufacture a semiconductor element, a desired pattern is formed on a substrate such as a wafer through various processes such as a photolithography process, an etching process, an ashing process, an ion implantation process, and a thin film deposition process on the substrate. In each process, various treating liquids and treating gases are used, and particles and process by-products are generated during the process. A liquid treatment process for the substrate is performed before and after each process in order to remove a thin film, particles, and process by-products on the substrate from the substrate. In a general liquid treatment process, the substrate is treated with a chemical and a rinsing liquid and then dried. In the liquid treatment process, a SiN on the substrate may be stripped.

The substrate treating method treating the substrate with the treating liquid such as a chemical and/or a rinsing liquid can be divided into a batch-type treating method of collectively treating a plurality of substrates in a vertical posture, and a single-type treating method of treating a substrate one by one in a horizontal posture.

In the batch-type treating method for collectively treating the plurality of substrates, the plurality of substrates are collectively immersed in the vertical posture in a treating bath in which the chemical or the rinsing liquid is stored to perform a substrate treatment. For this reason, a mass treatment of the substrate is excellent, and a treatment quality between each substrate is uniform. However, since the batch-type treating method is immersed in the vertical posture, if the pattern formed on the substrate has a high aspect ratio, a pattern leaning phenomenon may occur in a pattern formed on the substrate in a process of lifting the substrate from the treating bath. In addition, if the plurality of substrates are exposed to an air at once and a drying is not performed within a short period of time, a water mark may be generated in some of the substrates exposed to the air.

On the other hand, in a case of the single-type treating method for treating the substrate one by one, a substrate treatment is performed on supplying a chemical or a rinsing liquid to a single substrate rotating in a horizontal posture. In addition, in the single-type treating method, a risk of the pattern leaning phenomenon is low because a transferred substrate maintains the horizontal posture, and a risk of a watermark is low because the substrate is treated one by one and a treated substrate is dried immediately or liquid treated. However, in the case of the single-type treating method, the mass treatment of the substrate is poor, and the treatment quality between each substrate is relatively uneven compared to the batch-type treating method. In addition, if the substrate is rotated and spin-dried, if the pattern formed on the substrate has a high aspect ratio, there is a concern that the pattern formed on the substrate may collapse.

SUMMARY

Embodiments of the inventive concept provide a buffer chamber, a substrate treating apparatus, and a substrate treating method for efficiently treating a substrate.

Embodiments of the inventive concept provide a buffer chamber, a substrate treating apparatus, and a substrate treating method for improving a mass production of a substrate treatment.

Embodiments of the inventive concept provide a buffer chamber, a substrate treating apparatus, and a substrate treating method for relatively increasing an evenness of a treating quality between each substrate.

Embodiments of the inventive concept provide a buffer chamber, a substrate treating apparatus, and a substrate treating method for minimizing a leaning phenomenon from being generated on a pattern formed on a substrate.

Embodiments of the inventive concept provide a buffer chamber, a substrate treating apparatus, and a substrate treating method for efficiently treating a substrate having a pattern with a high aspect ratio formed thereon.

Embodiments of the inventive concept provide a buffer chamber, a substrate treating apparatus, and a substrate treating method for minimizing a drying of a top surface of a substrate having a pattern formed thereon, during a process of the substrate which has been treated in a batch-type manner is being transferred to a single-type treating chamber.

Embodiments of the inventive concept provide a buffer chamber, a substrate treating apparatus, and a substrate treating method for minimizing a contamination of a hand for transferring a substrate, during a process of which the substrate which has been treated in a single-type manner is being transferred to a single-type treating chamber.

Embodiments of the inventive concept provide a buffer chamber, a substrate treating apparatus, and a substrate treating method for minimizing a contamination of a hand of a transfer robot for transferring a substrate, in a process of transferring a substrate, on which a batch-type treatment is formed on a top surface so a thin film is formed by a wetting liquid on the substrate so a natural drying is prevented and on which a bottom surface is cleaned to be batch-type treated, to a chamber performing a single-type treatment.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a batch-type treating bath for treating a substrate in a batch-type manner; a single-type treating chamber for treating the substrate in a single-type manner; and a buffer chamber positioned on a transfer path of the substrate transferred between the batch-type treating bath and the single-type treating chamber, and supplying a liquid for maintaining a wetting state of the substrate.

In an embodiment, the buffer chamber includes: a chuck for supporting and rotating the substrate; and a liquid supply unit for supplying the liquid to the substrate supported and rotated on the chuck.

In an embodiment, the liquid supply unit includes: a first liquid supply unit configured to supply a first liquid to a top surface of the substrate supported on the chuck; and a second liquid supply unit configured to supply a second liquid to a bottom surface of the substrate supported on the chuck.

In an embodiment, the second liquid supply unit is configured to supply the second liquid which has a higher volatility than the first liquid supplied by the first liquid supply unit.

In an embodiment, the second liquid supply unit is configured to supply the second liquid which is an isopropyl alcohol (IPA).

In an embodiment, the first liquid supply unit is configured to supply the first liquid which is a water.

In an embodiment, the substrate treating apparatus further includes a controller configured to control the buffer chamber, and wherein the controller controls the buffer chamber so a rotation speed of the chuck becomes 300 RPM to 500 RPM while the liquid is supplied from the liquid supply unit.

In an embodiment, the substrate treating apparatus further include a controller configured to control the buffer chamber and the single-type treating chamber, and wherein the controller controls the buffer chamber and the single-type treating chamber so a treating time of the substrate in the buffer chamber is shorter than a treating time of the substrate in the single-type treating chamber.

In an embodiment, the substrate treating apparatus further includes a posture change treating bath positioned between the batch-type treating bath and the buffer chamber, and wherein a liquid stored in the posture change treating bath is a liquid which is the same as a liquid supplied by the liquid supply unit.

In an embodiment, the single-type treating chamber includes: a single-type liquid treating chamber for treating the substrate by supplying a treating liquid to the substrate; and a single-type drying chamber for dry treating the substrate, and wherein the apparatus further includes a transfer robot for transferring the substrate between the single-type liquid treating chamber, the single-type drying chamber and the buffer chamber.

In an embodiment, the transfer robot includes: a first hand; a second hand installed at a height lower than the first hand; and a third hand installed at a height lower than the second hand.

In an embodiment, the substrate treating apparatus further includes a controller configured to control the transfer robot, and wherein the controller controls the transfer robot so the first hand is used while transferring the substrate which is dry treated at the single-type drying chamber, the third hand is used while transferring the substrate which is wetted at the buffer chamber, and the second hand is used while transferring the substrate from the single-type liquid treating chamber to the single-type drying chamber.

In an embodiment, the substrate treating apparatus further includes a controller configured to control the buffer chamber, and wherein the controller controls the buffer chamber so a supply of the first liquid is started from the first liquid supply unit, and after a set time passes, a supply of the second liquid is started from the second liquid supply unit.

The inventive concept provides a buffer chamber. The buffer chamber includes a chuck for supporting and rotating a substrate; a first liquid supply unit configured to supply a first liquid to a first surface of the substrate supported at the chuck; a second liquid supply unit configured to supply a second liquid which has a higher volatility than the first liquid to a second surface, which is different from the first surface, of the substrate supported at the chuck.

In an embodiment, the chuck is controlled by a control unit to rotate at a speed from about 300 RPM to about 500 RPM.

In an embodiment, the buffer chamber further includes: a treating cup for recollecting the first liquid and the second liquid; and a lifting/lowering driver for lifting and lowering the treating cup, and wherein the treating cup defines at least two recollecting paths composed of a plurality of cups and which recollect different kinds of liquids, and the lifting/lowering driver is configured to lift and lower the treating cup to recollect the first liquid by any one of the recollecting paths and to recollect the second liquid by the other one of the recollecting paths.

The inventive concept provides a substrate treating apparatus. The substrate treating apparatus includes a first process treating unit for treating a substrate in a batch-type manner; a second process treating unit for treating the substrate in a single-type manner; and a controller, and wherein the first process treating unit includes a batch-type treating bath for treating substrates in a vertical posture, and the second process treating unit includes: a single-type liquid treating chamber for liquid treating the substrate by supplying a treating liquid to the substrate which is rotating; single-type drying chamber for dry treating the substrate by supplying a supercritical fluid to the substrate; a buffer chamber for supplying a liquid to the substrate so a wetting state of the substrate may be maintained; and a transfer robot for transferring the substrate between the buffer chamber, the single-type liquid treating chamber, and the single-type drying chamber.

In an embodiment, the first process treating unit includes: a posture change treating bath, which has a storage space for storing a liquid and at which a support member for supporting the substrate at the storage space in the vertical posture is positioned, for changing the substrate of the vertical posture to a horizontal posture; a posture change robot, which has a hand and an arm for moving the hand, for changing a posture of the substrate from the vertical posture to the horizontal posture; and wherein the buffer chamber is positioned at a position to receive the substrate which the posture change robot has taken out from the posture change treating bath.

In an embodiment, the buffer chamber includes: a chuck for supporting and rotating the substrate; a first liquid supply unit configured to supply a first liquid to a top surface of the substrate supported on the chuck; and a second liquid supply unit configured to supply a second liquid which has a higher volatility than the first liquid to a bottom surface of the substrate supported on the chuck.

In an embodiment, the substrate treating apparatus further includes a plurality of single-type liquid treating chambers, and wherein the plurality of single-type liquid treating chambers are installed stacked on each other, and the buffer chamber is installed at a position higher than a single-type liquid treating chamber installed at a bottom of the plurality of single-type liquid treating chambers, and at a position lower than the single-type liquid treating chamber installed at a top of the plurality of single-type liquid treating chambers.

The inventive concept provides a substrate treating method. The substrate treating method includes a liquid treating a plurality of substrates in a vertical posture; changing a posture of the substrate on which the liquid treating has been performed from the vertical posture to a horizontal posture; maintaining a wetting state of the substrate by supplying a wetting liquid to the substrate which has its posture changed; and single-type treating one substrate on which the maintaining the wetting state is performed and which is in the horizontal posture.

In an embodiment, at the maintaining the wetting state of the substrate, a chuck supports and rotates the substrate, and the wetting liquid is supplied to the substrate which is supported and rotated on the chuck.

In an embodiment, at the maintaining the wetting state of the substrate, the wetting liquid is supplied to a top surface of the substrate, and a cleaning liquid which is a different type from the wetting liquid is supplied to a bottom surface of the substrate.

In an embodiment, the cleaning liquid is a liquid having a volatility higher than the wetting liquid.

In an embodiment, the wetting liquid is a liquid including a water, and the cleaning liquid is a liquid including an isopropyl alcohol (IPA).

In an embodiment, a supply of the cleaning liquid is performed after a supply of the wetting liquid is started and after a set time passes.

In an embodiment, the substrate treating method further includes: transferring the substrate on which the maintaining the wetting state of the substrate is performed to a single-type treating chamber at which the single-type treating one substrate is performed, and wherein a transfer robot performing the transferring the substrate has a plurality of hands, and the transferring the substrate is performed by transferring the substrate to the single-type treating chamber by a hand positioned at a bottom among the plurality of hands.

In an embodiment, a time for performing the maintaining the wetting state of the substrate is shorter than a time for the single-type treating one substrate.

The inventive concept provides a substrate treating method. The substrate treating method includes a treating a substrate in a first chamber by supplying a first liquid to a first surface of a substrate and by supplying a second liquid having a higher volatility than the first liquid to a second surface of the substrate; taking out the substrate from the first chamber while the second surface of the substrate is supported by a hand of a transfer robot; and taking in the substrate which is taken out from the first chamber to a second chamber which is different from the first chamber.

In an embodiment, the substrate rotates while the first liquid and the second liquid is supplied to the first surface.

In an embodiment, a liquid film of the first liquid is formed on the first surface during a time when the transfer robot transfers the substrate.

In an embodiment, the first liquid is a wetting liquid for wetting a top surface of the substrate, and the second liquid is an organic solvent for cleaning a bottom surface of the substrate.

In an embodiment, the first liquid is a deionized water, and the second liquid is an isopropyl alcohol (IPA).

In an embodiment, the first chamber is a buffer chamber for temporarily storing the substrate, and the second chamber is a single-type treating chamber for treating the substrate in a single-type manner.

In an embodiment, the second chamber is a single-type liquid treating chamber for treating the substrate by supplying an organic solvent to the first surface of the substrate.

In an embodiment, the second chamber is a single-type drying chamber for dry-treating the substrate by transferring a treating fluid in a supercritical state to the substrate.

In an embodiment, the substrate is taken into the first chamber, after the substrate is treated at a batch-type treating bath.

In an embodiment, a posture of the substrate is changed from a vertical posture to a horizontal posture, and the substrate is taken into the first chamber, after being treated at the batch-type treating bath.

In an embodiment, a posture change of the substrate is performed while the substrate is immersed in a posture change treating bath containing the same liquid as the first liquid.

According to an embodiment of the inventive concept, a substrate may be efficiently treated.

According to an embodiment of the inventive concept, a mass production of a substrate treatment may be improved.

According to an embodiment of the inventive concept, an evenness of a treatment quality between each substrate may be increased.

According to an embodiment of the inventive concept, a danger of forming a water mark on a substrate may be minimized.

According to an embodiment of the inventive concept, a leaning phenomenon of a pattern formed on a substrate may be minimized.

According to an embodiment of the inventive concept, a substrate having a pattern with a high aspect radio formed thereon may be efficiently treated.

According to an embodiment of the inventive concept, a drying of a top surface of a substrate on which a pattern is formed may be minimized during a process of which a substrate which has been treated in a batch-type manner is transferred to a single-type treating chamber.

According to an embodiment of the inventive concept, a contamination of a hand which transfers a substrate may be minimized during a process of transferring a substrate treated in a batch-type manner to a single-type chamber.

According to an embodiment of the inventive concept, a contamination of a hand of a transfer robot for transferring a substrate may be minimized, in a process of transferring a substrate, on which a batch-type treatment is formed on a top surface so a thin film is formed by a wetting liquid on the substrate so a natural drying is prevented and on which a bottom surface is cleaned to be batch-type treated, to a chamber performing a single-type treatment.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
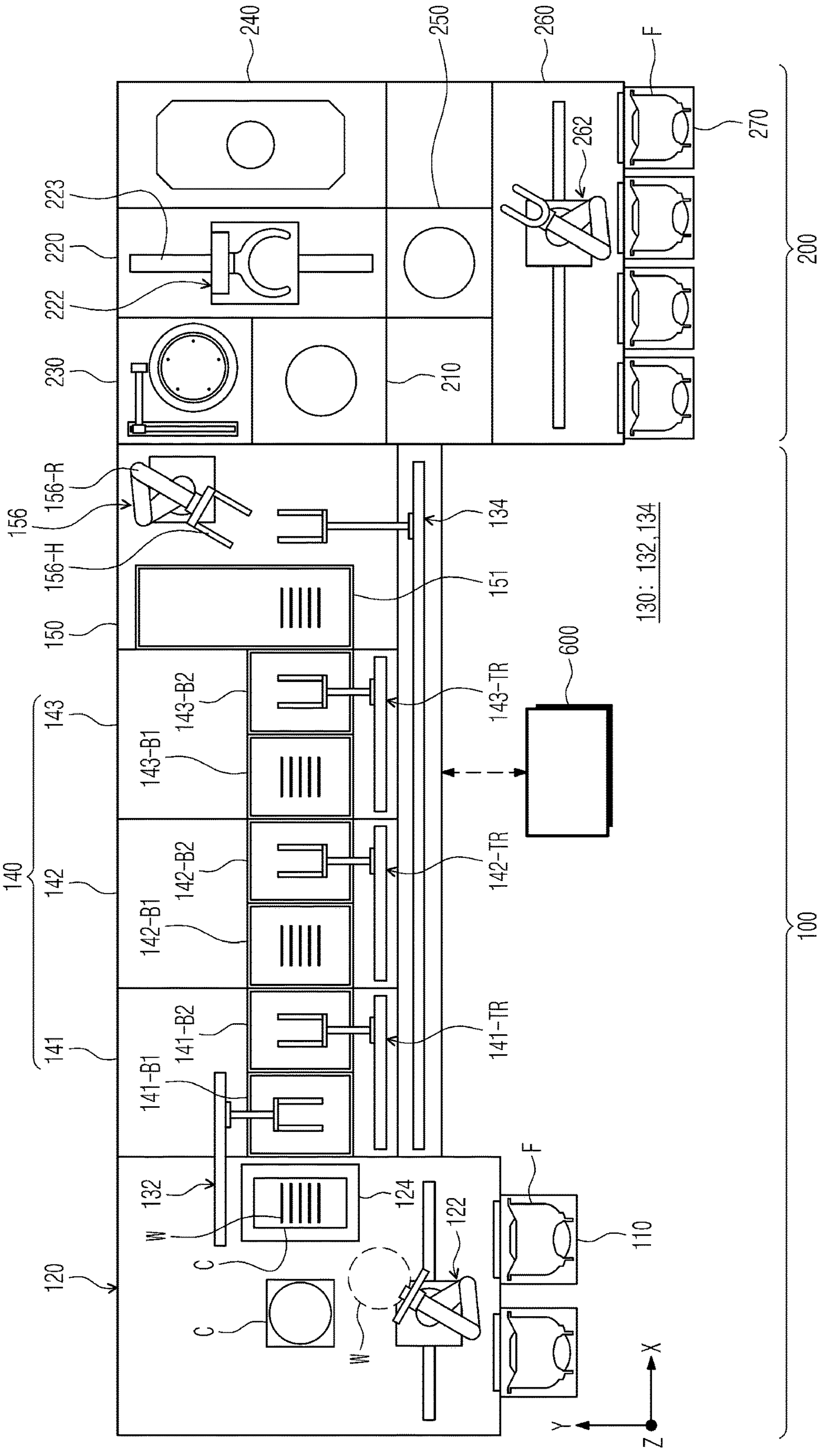
FIG. 1 schematically illustrates a substrate treating apparatus according to an embodiment of the inventive concept as viewed from above.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes", and/or "including" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Also, a configuration transferring a substrate W to be described later, for example, a transfer unit or transfer robots to be described later, may be referred to as a transfer module.

Hereinafter, an embodiment of the inventive concept will be described with reference to FIG. 1 to FIG. 25.

FIG. 1 is a schematic view of a substrate treating apparatus according to an embodiment of the inventive concept as viewed from above.

Referring to FIG. 1, the substrate treating apparatus 10 according to an embodiment of the inventive concept may include a first process treating unit 100, a second process treating unit 200, and a controller 600. The first process treating unit 100 and the second process treating unit 200 may be arranged in the first direction X when viewed from above. Hereinafter, when viewed from above, a direction perpendicular to the first direction X is referred to as a second direction Y, and a direction perpendicular to the first direction X and the second direction Y is referred to as a third direction Z.

The first process treating unit 100 may collectively liquid treat a plurality of substrates W in a batch manner. For example, the first process treating unit 100 may collectively clean the plurality of substrates W in a batch manner. The first process treating unit 100 may simultaneously process the plurality of substrates W in a vertical posture (a top or bottom surface of the substrate W parallel to a direction perpendicular to the ground).

The first process treating unit 100 may include a first load port unit 110, an index chamber 120, a transfer unit 130, a batch-type treating unit 140, and a posture change portion 150.

The first load port unit 110 may include at least one load port. A transfer container F in which at least one substrate W is stored may be placed on the load ports of the first load port unit 110. The plurality of substrates W may be stored in the transfer container F. For example, 25 substrates may be stored in the transfer container F. The transfer container F may be referred to as a cassette, a pod FOD, a FOUP, or the like. The transfer container F may be loaded onto the first load port unit 110 by a container transfer apparatus. The substrates W stored in the transfer container F placed in the first load port unit 110 may be untreated substrates W. An untreated substrate W may be, for example, a substrate W which has not been treated, or substrates W which have been partially treated but require a liquid treatment.

In addition, only the container F in which the untreated substrate W is stored may be placed on the first load port unit 110. That is, the first load port unit 110 may only serve to load the substrate W requiring a treatment.

The first load port unit 110 may be coupled to the index chamber 120. The index chamber 120 and the first load port unit 110 may be arranged in the second direction Y. The index chamber 120 may include an index robot 122 (i.e., a wafer transfer robot with an arm and a wafer holder at the end of the arm) and a posture change unit 124. The index robot 122 may take out a substrate W which has not been treated or which requires a treatment from the container F mounted on the first load port unit 110. The index robot 122 may take in the substrate W from the container F and take the substrate W into the storage container C provided in the index chamber 120. The index robot 122 may have an arrangement hand capable of simultaneously gripping and transferring a plurality of substrates W (e.g., 25 sheets).

The storage container C may have a substantially cylindrical shape. The storage container C may have a storage space therein. The plurality of substrates W may be stored in the storage space of the storage container C. For example, 50 substrates W may be stored in the storage space of the storage container C. The storage container C may have a cylindrical shape in which at least two or more of the surfaces of the storage container C are opened. A support member for supporting/gripping the substrate W may be provided in the storage space of the storage container C.

If the substrate W taken out from the transfer container F is completely brought into the storage container C, the storage container C may be taken to the posture change unit 124 arranged in the index chamber 120 by a transportation means (e.g., a transfer rail or a linear motor guide) which is not shown. The posture change unit 124 may rotate the storage container C. For example, the posture change unit 124 may rotate the storage container C such that an opened portion of the storage container C faces upward. If the open portion of the storage container C is rotated to face the top, the substrate W stored in the storage container C may be changed from the horizontal posture (i.e., a posture in which the top and bottom surfaces of the substrate W are horizontal relative to the ground) to the vertical posture. The horizontal posture may mean that the top surface of the substrate W (e.g., a patterned surface) is parallel to an X-Y plane (i.e., the ground), and the vertical posture may mean that the top surface of the substrate W is parallel to an X-Z plane or a Y-Z plane (i.e., a surface perpendicular to the ground).

The transfer unit 130 may include a first transfer unit 132 which transfers the substrate W between the index chamber 120 and the batch-type treating unit 140, and a second transfer unit 134 which transfers the substrate W between the batch-type treating unit 140 and the posture change portion 150 to be described later.

The first transfer unit 132 may include a rail extending along the first direction X and a hand configured to transfer the plurality of substrates W at once. The first transfer unit 132 may grip the substrates W which posture has been changed in a posture change unit 124 and transfer a gripped substrate W to the batch-type treating unit 140. For example, the first transfer unit 132 may transfer the substrates W which posture has been changed in the posture change unit 124 to any selected one of the batch-type treating baths 141-B1 to 143-B2 of the batch-type treating unit 140. For example, the first transfer unit 132 may transfer the substrates W which posture has been changed in the posture change unit 124 to the 1-1 batch-type treating bath 141-B1.

The second transfer unit 134 may include a rail extending along the first direction X and a hand configured to transfer the plurality of substrates W at once. The second transfer unit 134 may be configured to transfer the substrate W between the first batch-type treating unit 141, the second batch-type treating unit 142, and the third batch-type treating unit 143 which the batch-type treating unit 140 has. In addition, the second transfer unit 134 may be configured to transfer the substrate W between the batch-type treating unit 140 and the posture change portion 150.

Also, a position of the substrates W having a posture changed by the posture change unit 124 and stored in the storage container C and a position of the substrates W stored in the batch-type treating bath of the batch-type treating unit 140 may be arranged side by side along the first direction X when viewed from above.

In addition, the substrates W stored in the batch-type treating baths 141-B1 to 143-B2 of the batch-type treating unit 140 and the substrates W stored in the posture change treating bath 151 of the posture change portion 150 may be arranged side by side along the first direction X when viewed from above. In addition, the substrates W stored in the batch-type treating baths 141-B1 to 143-B2 of the batch-type treating unit 140 may be arranged side by side along the first direction X when viewed from above. In other words, support members 141-B1-6 of each of the batch-type treating baths 141-B1 to 141-B2 and a support member 153 of the posture change treating bath 151 may be arranged side by side along the first direction X when viewed from above.

The batch-type treating unit 140 may perform liquid treatment on a plurality of substrates W at once. The batch-type treating unit 140 may clean the plurality of substrates W at once using the treating liquid. The batch-type treating unit 140 may liquid treat the plurality of substrates W at once using the treating liquid. The treating liquid used in the batch-type treating unit 140 may be a chemical and/or a rinsing liquid. For example, the chemical may be a chemical having the properties of a strong acid or a strong base. Also, the rinsing liquid can be a pure water. For example, the chemical may be chosen appropriately among an Ammonia-Hydrogen Peroxide Mix (APM), a Hydrochloride Peroxide Mix (HPM), a Hydrofluoric acid (FPM), a Hydrofluoric acid (Hydrogen Peroxide Mix), a Diluted Hydrofluoric Acid Mix (DHF), a chemical removing a SiN, a chemical including a phosphoric acid, a chemical including a sulfuric acid, and the like. The rinsing liquid may be a liquid containing a water. For example, the rinsing liquid may be appropriately selected from a pure water or an ozone water.

The batch-type treating unit 140 may include a first batch-type treating unit 141, a second batch-type treating unit 142, and a third batch-type treating unit 143.

The first batch-type treating unit 141 may include a 1-1 batch-type treating bath 141-B1, a 1-2 batch-type treating bath 141-B2, and a first batch transfer unit 141-TR.

In the 1-1 batch-type treating bath 141-B1, the plurality of substrates W may be simultaneously liquid-treated with a chemical such as a DSP. In the 1-2 batch-type treating bath 141-B2, the plurality of substrates W may be simultaneously treated with a chemical such as a DHF. However, the inventive concept is not limited thereto, and the treating liquid used in the 1-1 batch-type treating bath 141-B1 and the 1-2 batch-type treating bath 141-B2 may be variously modified into a treating liquid selected from the above-described treating liquids.

The first batch transfer unit 141-TR may be configured to transfer the substrate W between the 1-1 batch-type treating bath 141-B1 and the 1-2 batch-type treating bath 141-B2.

The second batch-type treating unit 142 may include a 2-1 batch-type treating bath 142-B1, a 2-2 batch-type treating bath 142-B2, and a second batch transfer unit 142-TR.

In the 2-1st batch-type treating bath 142-B1, a plurality of substrates W may be simultaneously liquid-treated with a chemical containing phosphoric acid. In the 2-2nd batch-type treating bath 142-B2, a plurality of substrates W may be simultaneously treated with a rinsing liquid. However, the inventive concept is not limited thereto, and the treating liquid used in the 2-1st batch-type treating bath 142-B1 and the 2-2nd batch-type treating bath 142-B2 may be variously modified as the treating liquid selected from the above-described treating liquids.

The first batch transfer unit 141-TR may be configured to transfer the substrate W between the 1-1 batch-type treating bath 141-B1 and the 1-2 batch-type treating bath 141-B2.

The second batch-type treating unit 142 may include a 2-1 batch-type treating bath 142-B1, a 2-2 batch-type treating bath 142-B2, and a second batch transfer unit 142-TR.

In the 2-1 batch-type treating bath 142-B1, the plurality of substrates W may be simultaneously liquid-treated with a chemical containing a phosphoric acid. In the 2-2 batch-type treating bath 142-B2, the plurality of substrates W may be simultaneously with treated a rinsing liquid. However, the inventive concept is not limited thereto, and the treating liquid used in the 2-1 batch-type treating bath 142-B1 and the 2-2 batch-type treating bath 142-B2 may be variously modified as the treatment liquid selected from the above-described treating liquids.

The second batch transfer unit 142-TR may be configured to transfer the substrate W between the 2-1 batch-type treating bath 141-B1 and the 2-2 batch-type treating bath 142-B2.

The third batch-type treating unit 143 may include a 3-1 batch-type treating bath 142-B1, a 3-2 batch-type treating bath 143-B2, and a third batch transfer unit 143-TR.

In the 3-1 batch-type treating bath 143-B1, the plurality of substrates W may be simultaneously liquid-treated with a chemical containing a phosphoric acid. In the 3-2 batch-type treating bath 143-B2, the plurality of substrates W may be simultaneously treated with a rinsing liquid. However, the inventive concept is not limited thereto, and the treating liquid used in the 3-1 batch-type treating bath 143-B1 and the 3-2 batch-type treating bath 143-B2 may be variously modified as the treating liquid selected from the above-described treating liquids.

The third batch transfer unit 143-TR may be configured to transfer the substrate W between the 3-1 batch-type treating bath 143-B1 and the 3-2 batch-type treating bath 143-B2.

Since the batch-type treating baths 141-B1 to 143-B2 have the same or similar structure as each other except for the kind of treating liquid L used, the 1-1 batch-type treating bath 141-B1 will be described below, and repeated descriptions of the remaining batch-type treating baths 141-B2 to 143-B2 will be omitted.

Figure 2:
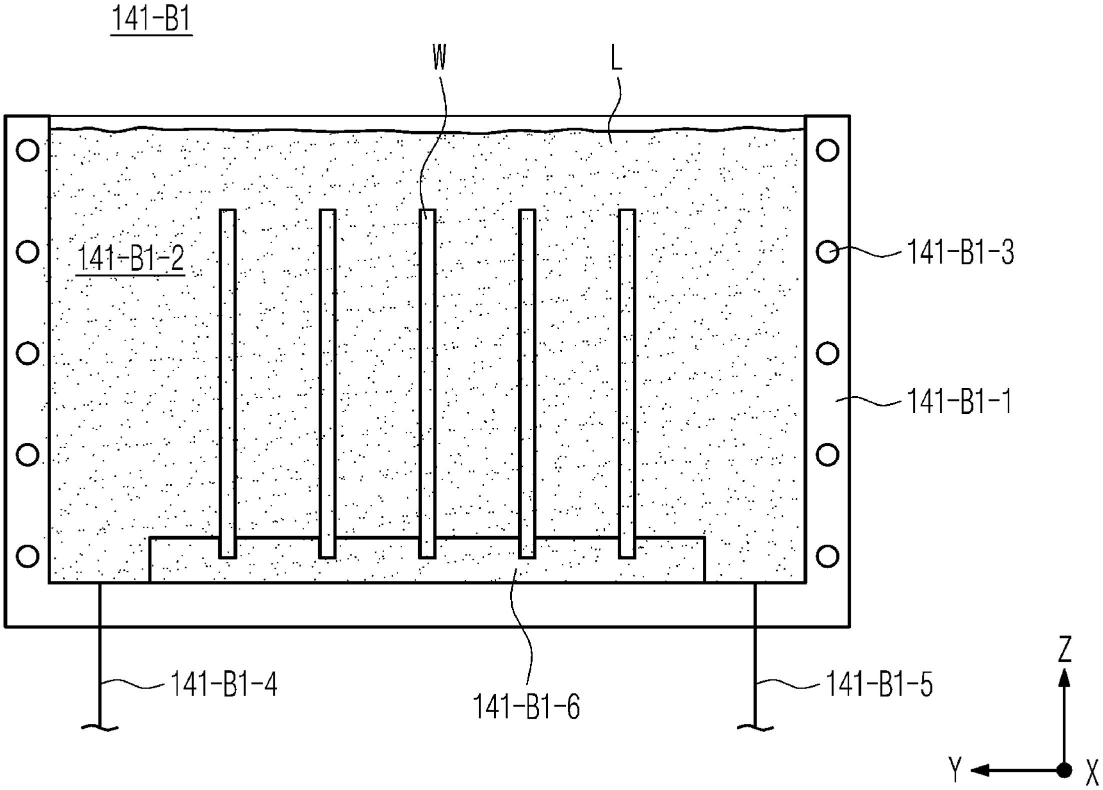
FIG. 2 illustrates any one batch-type treating bath among batch-type treating baths of FIG. 1.

FIG. 2 illustrates any one batch-type treating bath among batch-type treating baths of FIG. 1. For example, FIG. 2 illustrates a 1-1 batch-type treating bath 141-B1 among batch-type treating baths 141-B1 to 143-B2.

Referring to FIG. 2, the 1-1 batch-type treating bath 141-B1 may include a treating bath 141-B1-1, a heating member 141-B1-3, a supply line 141-B1-4, a recollecting line 141-B1-5, and a support member 141-B1-6.

The treating bath 141-B1-1 may have a storage space 141-B1-2 therein. The treating bath 141-B1-1 may have a cylindrical shape with an open top. The treating liquid L may be stored in the storage space 141-B1-2 of the treating bath 141-B1-1. To adjust a temperature of the treating liquid L stored in the storage space 141-B1-2, a heating member 141-B1-3 may be installed in the treating bath 141-B1-1. The heating member 141-B1-3 may heat the temperature of the treating liquid L stored in the storage space 141-B1-2 of the treating bath 141-B1-1 to a set temperature based on the temperature of the treating liquid L sensed by the temperature sensor which is not shown.

The supply lines 141-B1-4 may supply the treating liquid L to the storage space 141-B1-2. The recollecting line 141-B1-5 may drain the treating liquid L in the storage space 141-B1-2. A valve is installed in each of the supply lines 141-B1-4 and the recollecting lines 141-B1-5, and a level of the treating liquid L (an amount of the treating liquid L stored in the storage space 141-B1-2) supplied to the storage space 141-B1-2 can be adjusted to a set level based on a level of the treating liquid L sensed by a liquid level sensor which is not shown.

The support members 141-B1-6 may be disposed in the storage space 141-B1-2 to support the substrate W. The support member 141-B1-6 may be configured to support the plurality of substrates W. For example, the support member 141-B1-6 may be configured to support 50 substrates W. The support member 141-B1-6 may be disposed so that a pair of bar-shaped bodies face each other, and may be configured by forming a support groove (not shown) for supporting the substrate W in each body.

Referring back to FIG. 1, the posture change portion 150 may change the posture of the substrate W. The posture change portion 150 may change the substrate W having the vertical posture to the horizontal posture. The posture change portion 150 may change the posture of the substrate W so that the substrate W treated in the vertical posture in the batch-type treating unit 140 may be post-treated in single-type treating chambers 230 and 240 which treat the substrate W in the horizontal posture. In an embodiment, the single-type treating chambers 230 and 240 may treat a single wafer in a process. The posture change portion 150 may be disposed between the batch-type treating unit 140 and the second process treating unit 200.

The posture change portion 150 may include a posture change treating bath 151 and a posture change robot 156. When viewed from above, the posture change treating bath

151 may have a greater width than the batch-type treating baths 141-B1 to 143-B2. For example, when viewed from above, the posture change treating bath 151 may have a larger width in the second direction Y (a direction) than the batch-type treating baths 141-B1 to 143-B2. Also, the posture change treating bath 151 may have the same width as the batch-type treating baths 141-B1 to 143-B2 in the first direction X (another direction) when viewed from above.

Figure 3:
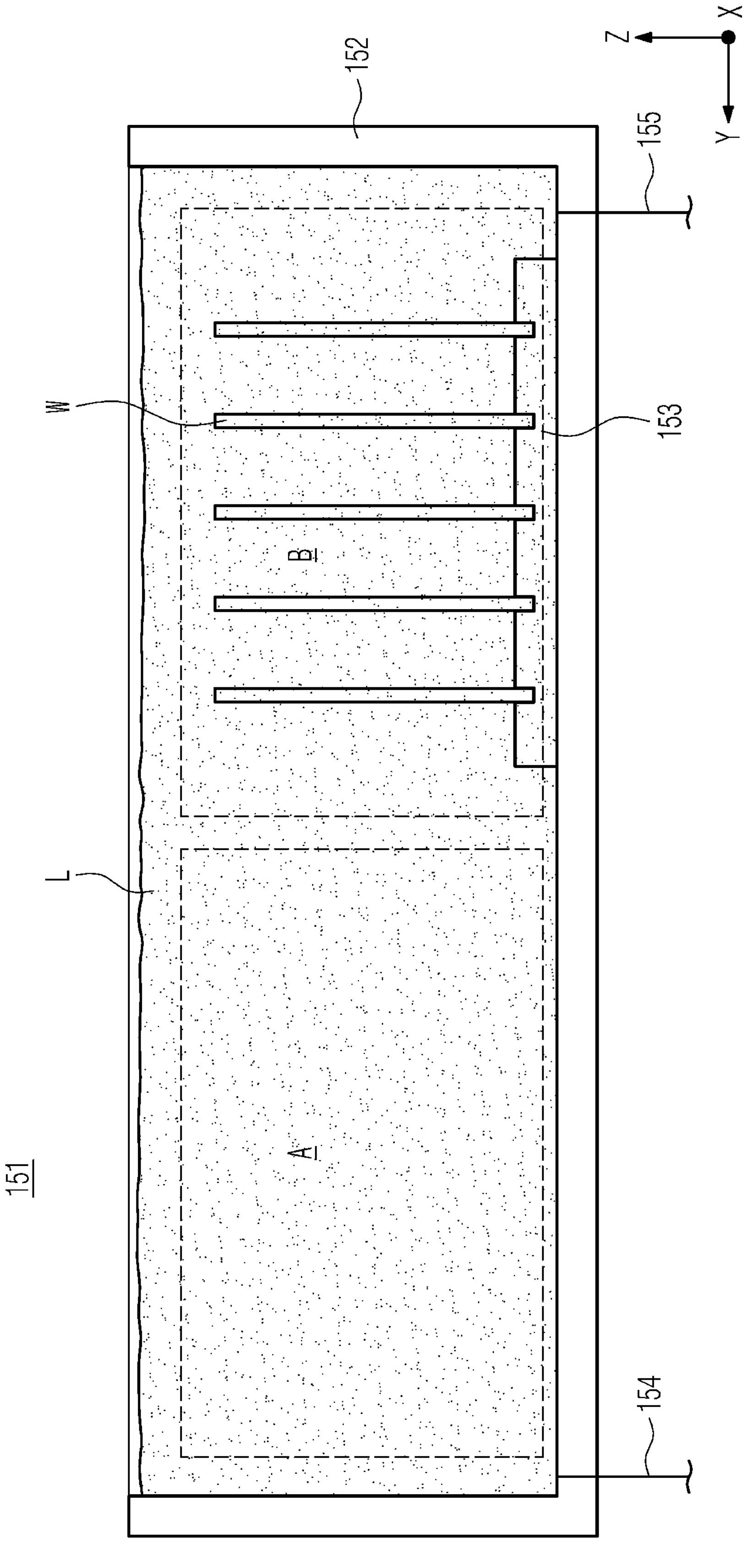
FIG. 3 illustrates a posture change treating bath of FIG. 1.

FIG. 3 illustrates a state of the posture change treating bath of FIG. 1.

Referring to FIG. 3, the posture change treating bath 151 may include a treating bath 152, a support member 153, a supply line 154, and a recollecting line 155.

The treating bath 152 may have a cylindrical shape with an open top. The treating bath 152 may have a rectangular cylindrical shape with an open top. The treating bath 152 may have storage spaces A and B in which the treating liquid L may be stored. The treating liquid L stored in the treating bath 152 may be a liquid containing a water. The type of the treating liquid L stored in the treating bath 152 may be the same type of wetting liquid sprayed from the buffer chamber 210 to be described later. For example, both the treating liquid L stored in the treating bath 152 and the wetting liquid sprayed from the buffer chamber 210 may be a liquid containing a water.

The support member 153 may be disposed in the storage spaces A and B to support the substrate W. The support members A and B may be configured to support a plurality of substrates W. For example, the support member 153 may be configured to support 50 substrates W. The support member 153 may be arranged so that a pair of rod-shaped bodies face each other, and a support groove (not shown) through which the substrate W can be supported is formed in each body.

The supply line 154 may supply the treating liquid L to the storage spaces A and B. The recollecting line 155 may drain the treating liquid L in the storage spaces A and B. A valve is installed in each of the supply lines 154 and the recollecting lines 155, and a level of the treating liquid L stored in the storage spaces (i.e., the storage spaces A, B) can be adjusted to a set level based on a level of the treating liquid L sensed by a liquid level sensor (not shown).

In addition, the storage spaces A and B may include a support region A and a posture change region B. The support region A may be a region in which the support member 153 supports the substrate W. The posture change region B may be a region in which the posture of the substrate W is changed by the posture change robot 156 to be described later.

Referring back to FIG. 1, the posture change robot 156 may be disposed on a side of the posture change treating bath 151. The posture change robot 156 may be disposed between the posture change treating bath 151 and the buffer chamber 210 to be described later. The posture change robot 156 may include a hand 156-H and a joint portion 156-R. The hand 156-H may be coupled to the joint portion 156-R. The joint portion 156-R may change a position of the hand 156-H.

Figure 4:
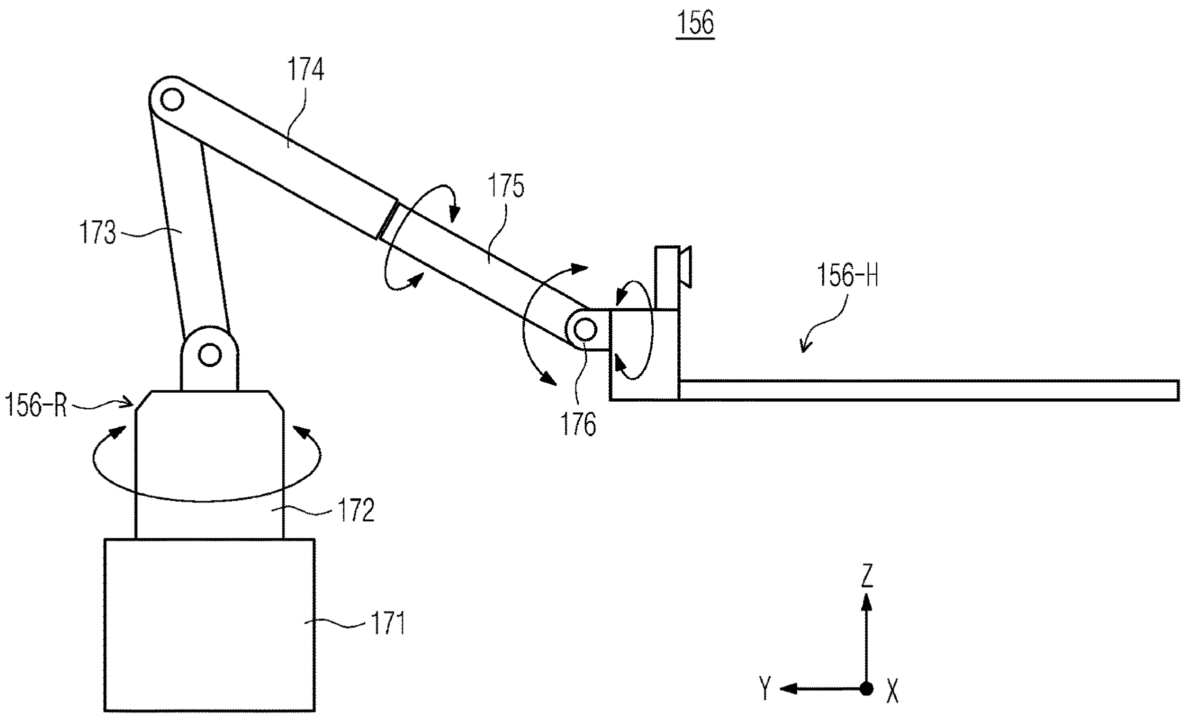
FIG. 4 schematically illustrates a posture change robot of FIG. 1.

FIG. 4 schematically illustrates the posture change robot of FIG. 1. Referring to FIG. 4, the posture change robot 156 according to an embodiment of the inventive concept may change the posture of the substrate W from the vertical posture to the horizontal posture in the posture change treating bath 151 and transfer the substrate W which posture has changed to the horizontal posture to the buffer chamber 210 of the second process treating unit 200. Also, the posture change robot 156 may be a multi joint robot. The posture change robot 156 may be a six-axis multi-joint robot.

The joint portion 156-R may be a multi-joint arm composed of at least two or more axes. For example, the joint portion 156-R may be a 6-axis multi joint arm. The joint portion 156-R may change the position of the hand 156-H by moving the hand 156-H in at least one of the first direction X, the second direction Y, and the third direction Z. In addition, the joint portion 156-R may rotate the hand 156-H based on one of the axes in the first direction X, the second direction Y, and the third direction Z.

The joint portion 156-R of the posture change robot 156 may include a base 171, a rotating body 172, a first arm 173, a second arm 174, a third arm 175, and a fourth arm 176.

The base 171 may be coupled to the rotating body 172. The rotating body 172 may rotate with respect to the base 171. The rotating body 172 may be rotated with a direction perpendicular to the ground as a rotation axis. The first arm 173 may be coupled to the rotating body 172. The first arm 173 may be rotated with respect to the rotation body with the horizontal direction as a rotation axis. The second arm 174 may be coupled to the first arm 173. The second arm 174 may be rotated with respect to the first arm 173 with the horizontal direction as a rotation axis. The third arm 175 may be coupled to the second arm 174. The third arm 175 may rotate around a lengthwise direction (or a lengthwise direction of the third arm 175) of the second arm 174. The fourth arm 176 may be rotated in a direction perpendicular to the lengthwise direction of the third arm 175. In addition, the fourth arm 176 may rotate the hand 156-H. For example, the fourth arm 176 may have a rotation shaft (not shown) capable of rotating the hand 156-H. The hand 156-H may be rotated in a direction perpendicular to a rotation axis of the fourth arm 176.

Figure 5:
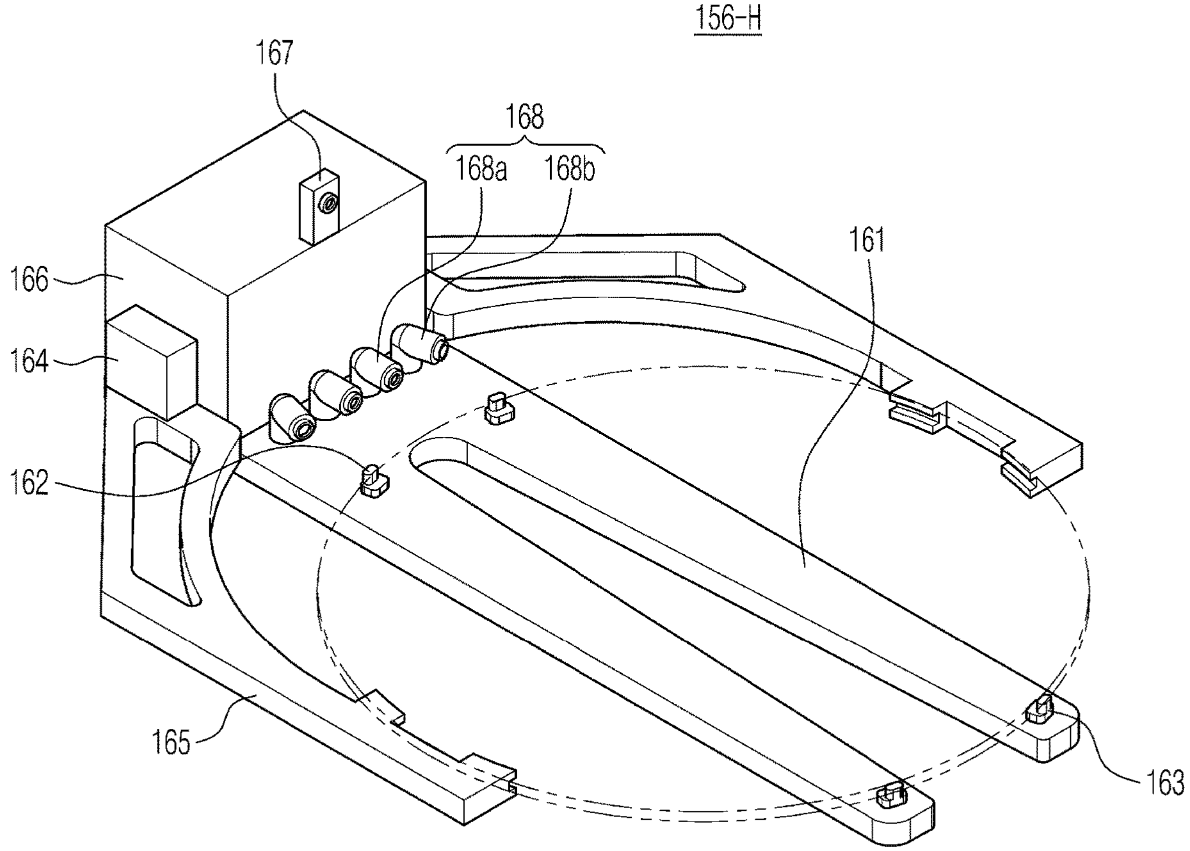
FIG. 5 illustrates a hand of FIG. 4.

FIG. 5 illustrates the hand of FIG. 4. Referring to FIG. 5, the hand 156-H of the posture change robot 156 may include a support body 161, a first guide unit 162, a second guide unit 163, a driving member 164, a chucking body 165, a fastening body 166, a vision member 167, and a liquid supply member 168.

The support body 161 may support a bottom surface of the substrate W. The support body 161 may support a top surface on which a pattern of the substrate W is formed, and a bottom surface of the substrate W on which the pattern is not formed. That is, the substrate W may be placed on the support body 161.

The support body 161 may be provided with a first guide unit 162 and a second guide unit 163. The first guide unit 162 may be a support pad adjacent to the fastening body 166 to be described later. The second guide unit 163 may be a support pad far from the fastening body 166 to be described later. Each of the first guide unit 162 and the second guide unit 163 may be provided in a pair. The first guide unit 162 and the second guide unit 163 may support a bottom surface and/or a side surface of the substrate W. The first guide unit 162 and the second guide unit 163 may have a stepped shape on top surfaces thereof. For example, a height of the inner region supporting the bottom surface of the substrate W among the top surfaces of the first guide unit 162 may be lower than a height of the outer region supporting the bottom surface of the substrate W. Similarly, the height of the inner region supporting the bottom surface of the substrate W among the top surfaces of the second guide unit 163 may be lower than the height of the outer region supporting the bottom surface of the substrate W. That is, the substrate W may be placed on the support body 161 via a first guide unit 162 and a second guide unit 163 installed in the support body 161. The substrate W placed on the support body 161 should be interpreted to include not only a case at which the support body 161 and the substrate W come into direct contact, but also the substrate W placed on the first guide unit 162 and the second guide unit 163 installed on the support body 161.

The driving member 164 may be fastened to the fastening body 166. The driving member 164 may be a driver capable of moving the chucking body 165 in a lateral direction. A pair of driving members 164 may be provided. For example, the driving member 164 may be provided to correspond to each of the chucking bodies 165 provided in a pair. The pair of driving members 164 may move the pair of chucking bodies 165 in the lateral direction. The chucking bodies 165 may be moved in a direction closer to a side of the substrate W and in a direction away from the side of the substrate W. Accordingly, the chucking body 165 may chuck the substrate W placed on the support body 161. In other words, the support body 161 and the chucking body 165 may be bodies gripping the substrate W.

The fastening body 166 may be a body which couples the chucking body 165 and the support body 161 to the joint portion 156-R. The fastening body 166 may be a body that couples the chucking body 165 and the support body 161 to the fourth arm 176 of the joint portion 156-R. The fastening body 166 may be fastened to a rotation shaft of the fourth arm 176 of the joint portion 156-R.

A first guide unit 162 and a second guide unit 163 may be provided to each of the support bodies 161. The first guide unit 162 may be a protrusion close to the fastening body 166 to be described later. The second guide unit 163 may be a protrusion relatively far from the fastening body 166 to be described later. The second guide unit 163 may be disposed farther from the fastening body 166 than the first guide unit 162. The first guide unit 162 and the second guide unit 163 may support a side portion of the substrate W. The first guide unit 162 and the second guide unit 163 support the side of the substrate W, and a distance between the two may be slightly smaller than a diameter of the substrate W.

The vision member 167 may acquire an image of the substrate W and/or the support body 161. An acquired image may be transmitted to the controller 600 to be described later. The controller 600 may generate a control signal for controlling a driving of the posture change robot 156 based on the image acquired by the vision member 167.

The liquid supply member 168 may supply the wetting liquid WL to the substrate W placed on the support body 161. The wetting liquid WL may include a water. The wetting liquid WL supplied by the liquid supply member 168 may be the same kind of liquid as the treating liquid L stored in the storage spaces A and B. In addition, the wetting liquid WL supplied by the liquid supply member 168 may be the same type of the wetting liquid WL supplied by the buffer chamber 210 described later.

The liquid supply member 168 may include a first nozzle 168*a* and a second nozzle 168*b*. At least one of the first nozzles 168*a* and the second nozzles 168*b* may be provided. A plurality of first nozzles 168*a* and a plurality of second nozzles 168*b* may be provided. The first nozzle 168*a* may supply the wetting liquid WL to a first region of the substrate W placed on the support body 161. The second nozzle 168*b* may supply the wetting liquid WL to a second region of the substrate W placed on the support body 161. The first region and the second region may be different regions. The first region and the second region may be edge regions of the substrate W as described below. The first region may be adjacent to the first nozzle 168*a*, and the second region may be adjacent to the second nozzle 168*b*.

A distance between the first region and the first nozzle 168*a* may be shorter than a distance between the second region and the second nozzle 168*b*. That is, a spray distance of the wetting liquid WL supplied from the first nozzle 168*a* may be different from a spray distance of the wetting liquid WL supplied from the second nozzle 168*b*. For example, the spray distance of the wetting liquid WL supplied from the first nozzle 168*a* may be shorter than the spray distance of the wetting liquid WL supplied from the second nozzle 168*b*.

Also, when viewed from above, the first nozzles 168*a* may be disposed between the second nozzles 168*b*. The second nozzles 168*b* may be disposed at a position relatively close to the chucking body 165, which is at an outer side. The first nozzles 168*a* may be disposed at a position relatively far from the chucking body 165, which is at an inner side.

The spraying directions of the wetting liquid WL of the first nozzle 168*a* and the second nozzle 168*b* may be different from each other. For example, based on a virtual reference line passing through a center of the substrate W and a center of the vision member 167 when viewed from above, the first nozzle 168*a* may supply the wetting liquid WL in a direction parallel to the reference line, and the second nozzle 168*b* may supply the wetting liquid WL in a direction inclined to the reference line.

The diameters of the spray holes of the first nozzle 168*a* and the second nozzle 168*b* may be different from each other. For example, the diameter of the spray hole of the first nozzle 168*a* may be larger than the diameter of the spray hole of the second nozzle 168*b*. For example, a supply flow rate of the wetting liquid WL transmitted to the first nozzle 168*a* and the second nozzle 168*b* may be the same per unit time. Accordingly, a spray distance of the wetting liquid WL sprayed from the first nozzle 168*a* may be shorter than a spray distance of the wetting liquid WL sprayed from the second nozzle 168*b*.

In addition, the first nozzle 168*a* and the second nozzle 168*b* may be installed on the support body 161.

Referring back to FIG. 1, the second process treating unit 200 may treat the substrate W treated by the first process treating unit 100. The second process treating unit 200 may treat the substrate W treated by the first processing treating unit 100, and may liquid treat or dry treat the substrate W in single-type manner.

The second process treating unit 200 may include a buffer chamber 210, a first transfer chamber 220, a single-type liquid treating chamber 230, a drying chamber 240, a buffer unit 250, a second transfer chamber 260, and a second load port unit 270. Both the single-type liquid treating chamber 230 and the drying chamber 240 may be referred to as single-type treating chambers.

The buffer chamber 210 may temporarily store the substrate W. In the buffer chamber 210, substrates W treated in the batch-type treating baths 141-B1 to 143-B2 may be posture changed by the posture change robot 156 in the posture change portion 150 and may be disposed on a transfer path of the substrate W transferred to the single-type treating chambers 230 and 240. That is, the buffer chamber 210 may be disposed on the transfer path of the substrate W transferred between the batch-type treating baths 141-B1 to 143-B2 and the single-type treating chambers 230 and 240.

The posture change robot 156 may change the posture of the substrate W and bring the posture changed substrate W into the buffer chamber 210. The buffer chamber 210 may temporarily store the substrate W and supply a wetting liquid so that the substrate W may maintain a wetting state. The buffer chamber 210 may form a liquid film by supplying the wetting liquid to the substrate W. The substrate W on which the liquid film is formed may be taken out from the buffer chamber 210 by a first transfer robot 222 to be described later. The substrate W taken out from the buffer chamber 210 may be transferred to the single-type treating chambers 230 and 240 by the first transfer robot 222 to the single-type treating chambers 230 and 240.

In addition, the buffer chamber 210 may be disposed at a position higher than the posture change treating bath 151. For example, if the posture change treating bath 151 is disposed on the first layer, the buffer chamber 210 may be disposed on the second layer or at a height of about 1.5 layers.

In addition, the buffer chamber 210 may be arranged side by side in the second direction Y with the single-type liquid treating chamber 230 to be described later.

Figure 6:
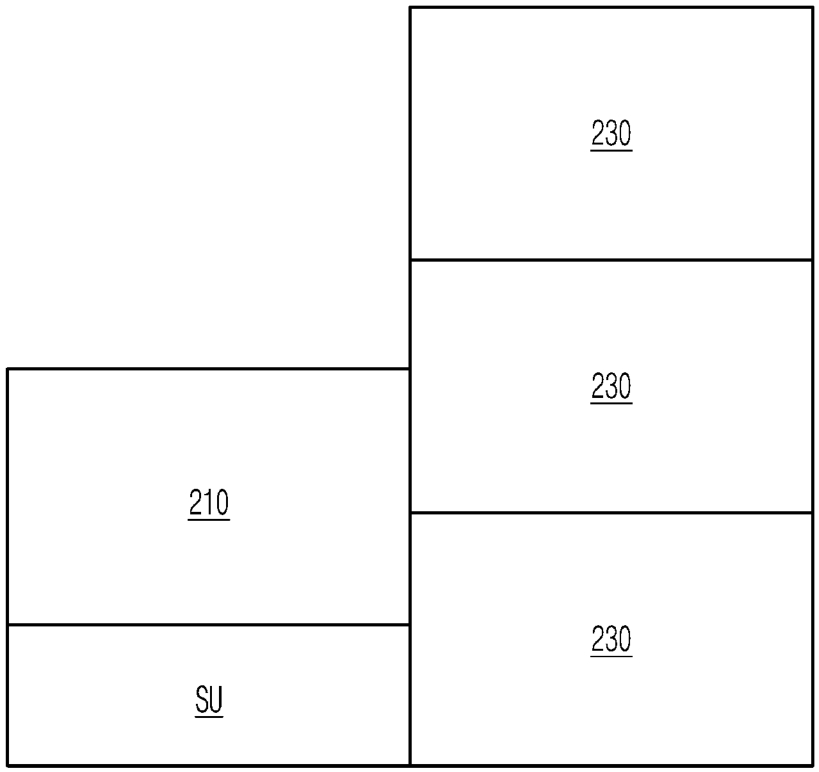
FIG. 6 schematically illustrates an arrangement of a single-type liquid treating chamber and a buffer chamber of FIG. 1.

In addition, a plurality of single-type liquid treating chambers 230 to be described later may be provided. The single-type liquid treating chambers 230 may be installed by being stacked on each other. For example, three single-type liquid treating chambers may be provided and installed to be stacked on each other as shown in FIG. 6. The buffer chamber 210 may be installed at a position higher than the single-type liquid treating chamber 230 installed at a bottom of a plurality of single-type liquid treating chambers 230, and may be installed lower than the single-type liquid treating chamber 230 installed at a top of the single-type liquid treating chambers 230. For example, the buffer chamber 210 may be installed at a height of about 1.5 layers or 2.5 layers. This is to allow the posture change robot 156 to more easily take the substrate W into the buffer chamber 210.

Figure 7:
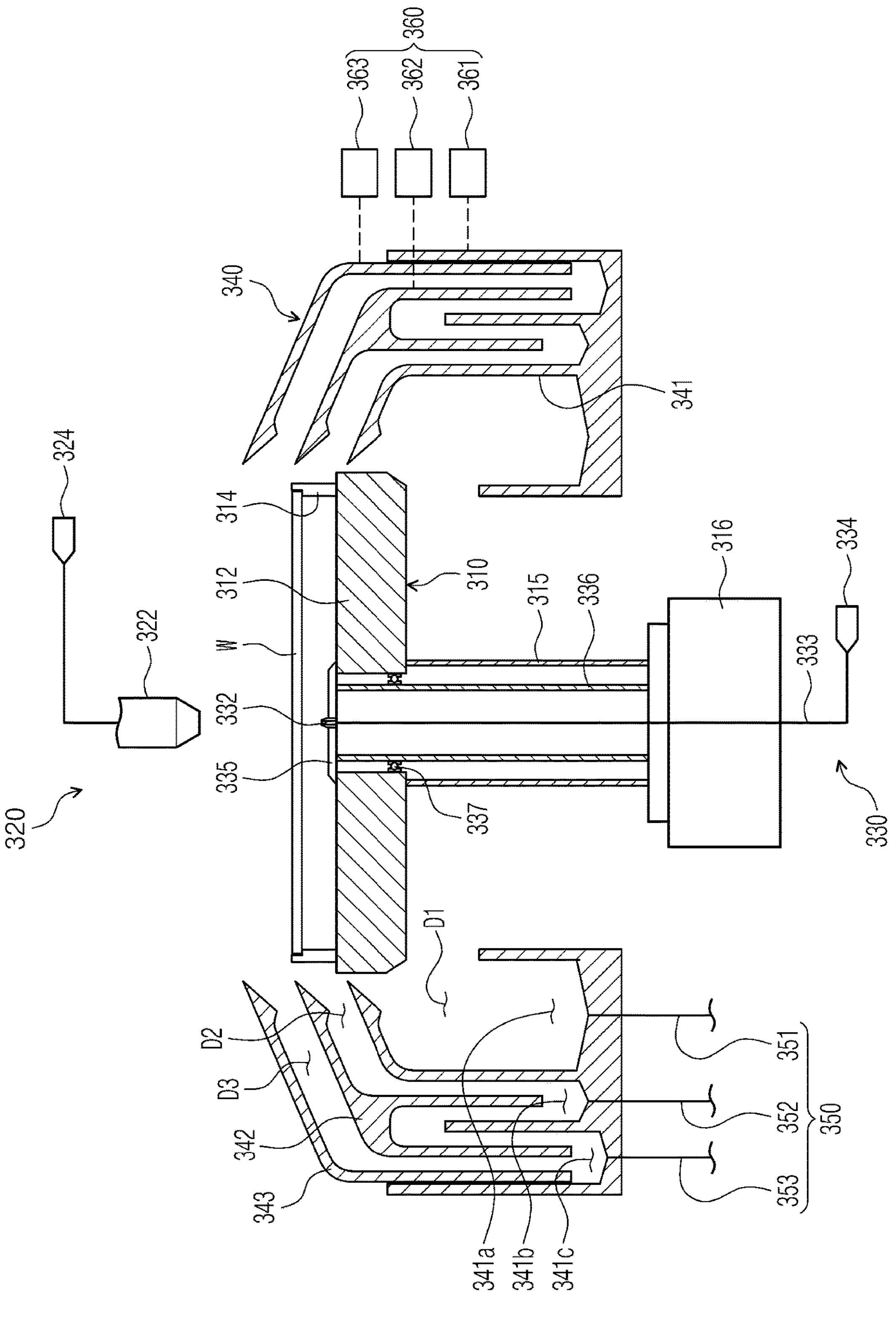
FIG. 7 schematically illustrates the buffer chamber of FIG. 6.

FIG. 7 schematically illustrates the buffer chamber of FIG. 6. Referring to FIG. 7, the buffer chamber 210 may include a chuck 310, liquid supply units 320, 330, a cup 340, a drain line 350, and a lifting/lowering driver 360.

The chuck 310 may support and rotate the substrate W. The chuck 310 may include a chuck body 312, a support pin 314, a rotation shaft 315, and a hollow motor 316.

The chuck body 312 may have a plate shape. When viewed from above, the chuck body 312 may have a through opening formed in a central region. At least a portion of a liquid supply shaft 326, which will be described later, may be inserted into the through opening formed in the chuck body 312. A support pin 314 may be installed on the chuck body 312. The support pin 314 may support and chuck a bottom surface and/or a side surface of the substrate W. The support pin 314 may be provided to be movable in a lateral direction by a pin moving mechanism which is not shown.

The rotation shaft 315 may be coupled to the chuck body 312. The rotation shaft 315 may be a hollow shaft having a hollow space. The rotation shaft 315 may be coupled to the chuck body 312 to rotate the chuck body 312. The rotation shaft 315 may be coupled to the hollow motor 316 to be rotated by receiving a power from the hollow motor 316. A liquid supply shaft 326, which will be described later, may be inserted into the hollow space of the rotation shaft 315.

The liquid supply units 320 and 330 may supply the liquid to the substrate W. The liquid supply units 320 and 330 may supply the wetting liquid and the cleaning liquid to the substrate W. The liquid supply unit 320 may include a first liquid supply unit 320 and a second liquid supply unit 330. The first liquid supply unit 320 and the second liquid supply unit 330 may supply the wetting liquid or the cleaning liquid to a rotating substrate W. For example, the first liquid supply unit 320 may be configured to supply the first liquid, which is a wetting liquid and is water, to a top surface of the rotating substrate W. In addition, the second liquid supply unit 330 and may be configured to supply the second liquid, which is cleaning liquid and an isopropyl alcohol (IPA), to a bottom surface of the rotating substrate W.

The first liquid supply unit 320 may be configured to supply the first liquid to the top surface of the substrate W supported by the chuck 310. The first liquid supply unit 320 may include a first nozzle 322 and a first liquid supply source 324.

The first nozzle 322 may supply the first liquid to the top surface of the substrate W. The first liquid supply source 324 may store the first liquid and supply the first liquid to the first nozzle 322. The first nozzle 322 receiving the first liquid from the first liquid supply source 324 may discharge the first liquid to the substrate W. The first nozzle 322 may be provided to be movable in a vertical direction and/or a lateral direction by a nozzle moving mechanism which is not shown.

The second liquid supply unit 330 may be configured to supply the second liquid to the bottom surface of the substrate W supported by the chuck 310. The second liquid supply unit 330 may be configured to supply a second liquid (e.g., an isopropyl alcohol, a cleaning liquid), which is a type of liquid more volatile than the first liquid supplied by the first liquid supply unit 320.

The second liquid supply unit 330 may include a second nozzle 332, a second liquid supply line 333, a second liquid supply source 334, a cover 335, a liquid supply shaft 336, and a bearing 337.

The second nozzle 332 may be configured to supply the second liquid to the bottom surface of the rotating substrate W. The second nozzle 332 may be configured to supply the second liquid to the bottom surface of the substrate W which is supported by the chuck 310. The second nozzle 332 may be connected to the second liquid supply line 333. The second liquid supply line 333 may be connected to the second liquid supply source 334. The second liquid supplied by the second liquid supply source 334 may be transferred to the second nozzle 332 through the second liquid supply line 333. The second liquid transferred to the second nozzle 332 through the second liquid supply line 333 may be supplied to the bottom surface of the rotating substrate W supported by the chuck 310.

In addition, the cover 335 may cover a through opening formed in the central region of the chuck body 312 described above. Accordingly, it is possible to minimize an inflow of liquid supplied by the first liquid supply unit 320 and the second liquid supply unit 330 into a through opening formed in the chuck body 312. In addition, the above-described second nozzle 332 may be installed on the cover 335.

At least a portion of the liquid supply shaft 336 may be inserted into the through opening formed in the chuck body 312. The bearing 337 may be installed between an outer surface of the liquid supply shaft 336 and the chuck body 312. Accordingly, even if the rotation shaft 315 is rotated by the hollow motor 316, the liquid supply shaft 336 may be fixed without being rotated. That is, the liquid supply shaft 336 may be independent of a rotation of the rotation shaft 315. The second liquid supply line 333 described above may be provided in a hollow space of the liquid supply shaft 336. Accordingly, the second liquid supply line 333 may be damaged by a rotation of the chuck body 312 or the like, or the second liquid supply line 333 may be exposed to the first liquid or the second liquid to minimize a damage to the second liquid supply line 333.

The cup 340 may recollect the liquid supplied by the liquid supply units 320 and 330. The cup 340 may be configured to separately recollect the first liquid supplied by the first liquid supply unit 320 and the second liquid supplied by the second liquid supply unit 330. In addition, the cup 340 may block a scattering to the outside of liquids supplied by the liquid supply units 320 and 330.

The cup 340 may include a first cup 341, a second cup 342, and a third cup 343. The first cup 341 may be an inner cup. The first cup 341 may define a first drain space 341*a*, a second drain space 341*b*, and a third drain space 341*c*. The first drain space 341*a*, the second drain space 341*b*, and the third drain space 341*c* can be a space to collect a scattered liquid supplied to the substrate W. For example, the first drain space 341*a* may be a space in which the first liquid supply unit 320 collects the first liquid supplied to the substrate W and scattered from the substrate W. In addition, the second drain space 341*b* may be a space in which the second liquid supply unit 330 collects the second liquid supplied to the substrate W and scattered from the substrate W. In addition, the third drain space 341*c* may be a space for collecting in which a remaining liquid that the first drain space 341*a* and the second drain space 341*b* could not collect, which was supplied by the first liquid supply unit 320 and the second liquid supply unit 330 and scattered from the substrate W.

The first drain space 341*a* may be positioned adjacent to the chuck 310, the second drain space 341*b* may be positioned farther from the chuck 310 than the first drain space 341*a*, and the third drain space 341*c* may be positioned farther from the chuck 310 than the second drain space 341*b*.

In addition, the drain line 350 may discharge liquids collected in the aforementioned drain spaces 341*a* to 341*c* to the outside. The drain line 350 may include a first drain line 351 connected to the first drain space 341*a*, a second drain line 352 connected to the second drain space 341*b*, and a third drain line 353 connected to the third drain space 341*c*.

The second cup 342 may be a middle cup. The third cup 343 may be an outer cup. The first cup 341 may define a first recollecting path D1 corresponding to the first drain space 341*a*. The first cup 341 and the second cup 342 may be combined with each other to define a second recollecting path D2 corresponding to the second drain space 341*b*. The second liquid supplied by the aforementioned second liquid supply unit 330 may be recollected through the second recollecting path D2. The second cup 342 and the third cup 343 may be combined with each other to define a third recollecting path D3. The first liquid supplied by the aforementioned first liquid supply unit 320 may be recollected through the third recollecting path D3.

The lifting/lowering driver 360 may lift and lower the cup 340. The lifting/lowering driver 360 may independently lift/lower the first cup 341, the second cup 342, and the third cup 343. The lifting/lowering driver 360 may include a first lifting/lowering driver 361 for lifting/lowering the first cup 341, a second lifting/lowering driver 362 for lifting/lowering the second cup 342, and a third lifting/lowering driver 363 for lifting/lowering the third cup 343. The lifting/lowering driver 360 may adjust heights of the above-described recollecting paths D1, D2, and D3 by adjusting heights of the cups 341, 342, and 343, and the intervals between the recollecting paths D1, D2, and D3.

Referring back to FIG. 1, a first transfer chamber 220 may be disposed at a side of the buffer chamber 210 and the single-type liquid treating chamber 230. The above-described buffer chamber 210 may be disposed between the first transfer chamber 220 and the posture change portion 150. In addition, the first transfer chamber 220 may be disposed between the buffer chamber 210 and the single-type drying chamber 240 to be described later. In addition, the first transfer chamber 220 may be disposed between the single-type drying chamber 240 and the single-type liquid treating chamber 230 to be described later.

The first transfer chamber 220 may include a first transfer robot 222 and a transfer rail 223. The first transfer robot 222 may move along the transfer rail 223. A lengthwise direction of the transfer rail 223 may be parallel to the second direction Y. The first transfer robot 222 may move along the transfer rail 223.

Figure 8:
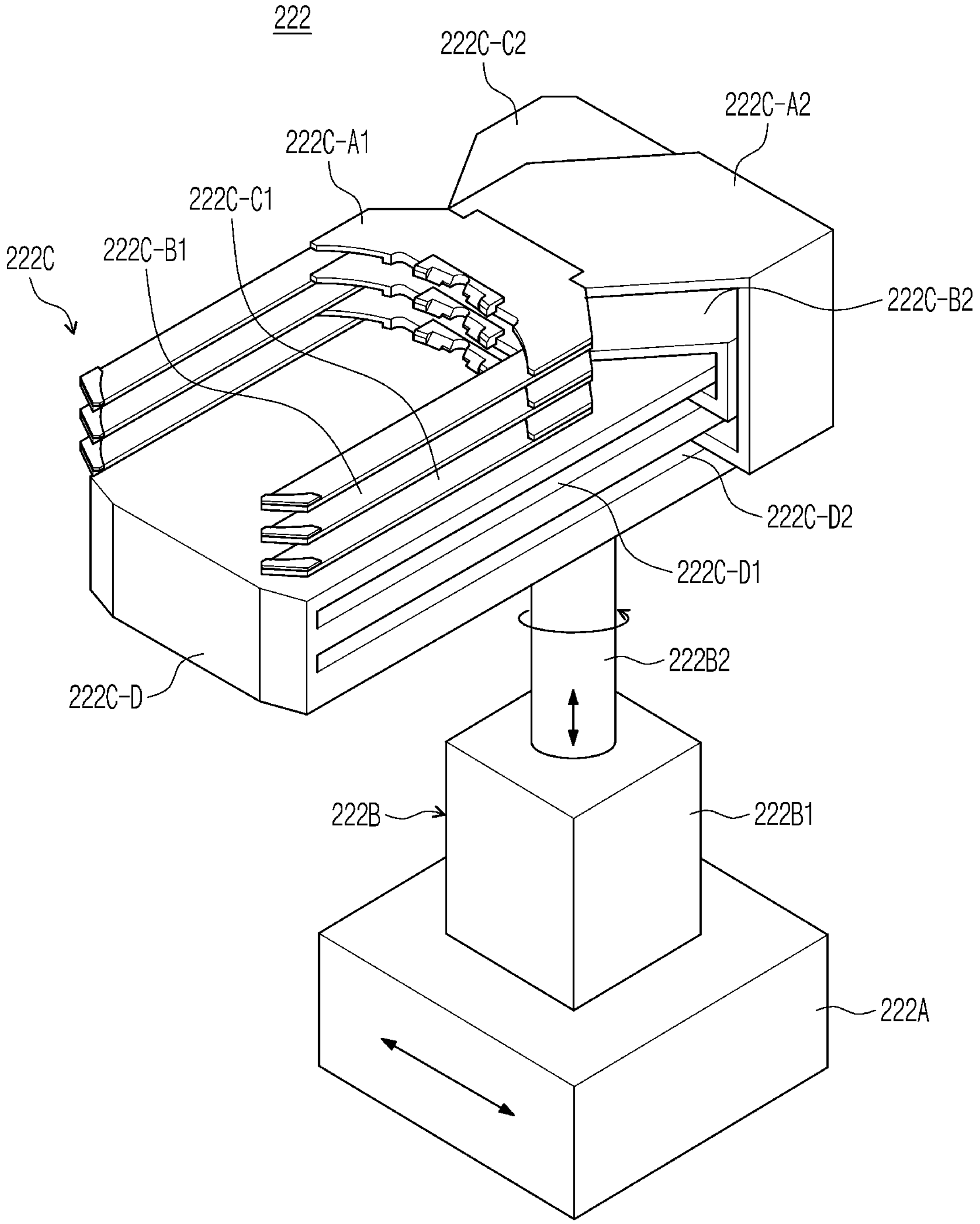
FIG. 8 schematically illustrates a first transfer robot of FIG. 1.

FIG. 8 schematically illustrates the first transfer robot of FIG. 1. Referring to FIG. 8, the first transfer robot 222 may include a rail driving unit 222A, a hand driving unit 222B, and a hand unit 222C. The rail driving unit 222A may be slidably provided on the above-described transfer rail 223. The rail driving unit 222A may include a driving motor to travel along the transfer rail 223.

The hand driving unit 222B may rotate the hand unit 222C. The hand driving unit 222B may move the hand unit 222C in the vertical direction. The hand driving unit 222B may include a driving box 222B1 and a driving shaft 222B2. The driving box 222B1 may include a driving apparatus which rotates the driving shaft 222B2 or moves the driving shaft 222B2 in the vertical direction. The driving shaft 222B2 may rotate a hand unit 222C 360 degrees. That is, a position of the hand unit 222C may be changed according to the second direction Y by the rail driving unit 222A, may be rotated around the third direction Z by the hand driving unit 222B, or a height may be changed according to the third direction Z.

The hand unit 222C may include a first hand 222C-A1, a first hand moving body 222C-A2, a second hand 222C-B1, a second hand moving body 222C-B2, a third hand 222C-C1, a third hand moving body 222C-C2, and a sliding body 222C-D.

The first hand 222C-A1 may be configured to support a bottom surface of the substrate W. The first hand 222C-A1 may be installed at a height higher than the second hand 222C-B1 and the third hand 222C-C1. The first hand 222C-A1 may be coupled to the first hand moving body 222C-A2. The first hand moving body 222C-A2 may be slidably installed in the second sliding groove 222C-D2 formed in the sliding body 222C-D. The first hand 222C-A1 may be configured to be forwardly and backwardly movable by a movement of the first hand moving body 222C-A2.

The second hand 222C-B1 may be configured to support the bottom surface of the substrate W. The second hand 222C-B1 may be installed at a height higher than that of the third hand 222C-C1 and a height lower than that of the first hand 222C-A1. The second hand 222C-B1 may be coupled to the second hand moving body 222C-B2. The second hand moving body 222C-B2 may be slidably installed in a first sliding groove 222C-D1 formed in the sliding body 222C-D. The second hand 222C-B1 may be configured to be forwardly and backwardly movable by a movement of the second hand moving body 222C-B2.

The third hand 222C-C1 may be configured to support the bottom surface of the substrate W. The third hand 222C-C1 may be installed at a height lower than the first hand 222C-A1 and the second hand 222C-B1. The third hand 222C-C1 may be coupled to the third hand moving body 222C-C2. The third hand moving body 222C-C2 may be slidably installed in the first sliding groove 222C-D1 or the second sliding groove 222C-D2 formed in the sliding body 222C-D on a side opposite to the first and second hand moving bodies. In contrast, the third hand moving body 222C-C2 may be slidably installed on the third sliding groove (not shown), which is different from the first sliding groove 222C-D1 and the second sliding groove 222C-D2 formed in the sliding body 222C-D. The third hand 222C-C1 may be configured to be forwardly and backwardly movable by a moving of the third hand moving body 222C-C2.

Referring back to FIG. 1, a single-treating chamber may be disposed at a side and at another side of the first transfer chamber 220. The single-type treating chamber may include a single-type liquid treating chamber 230 and a single-type drying chamber 240. A single-type liquid treating chamber 230 may be disposed on a side of the first transfer chamber 220. A single-type drying chamber 240 may be disposed on the other side of the first transfer chamber 220. A plurality of single-type liquid treating chambers 230 and single-type drying chambers 240 may be provided, respectively. As described above, the plurality of single-type liquid treating chambers 230 may be provided and installed to be stacked on each other. In addition, the plurality of single-type drying chambers 240 may be provided and installed to be stacked on each other. Each of the single-type liquid treating chamber 230 and the single-type drying chamber 240 may be provided in n (n is a natural number).

Figure 9:
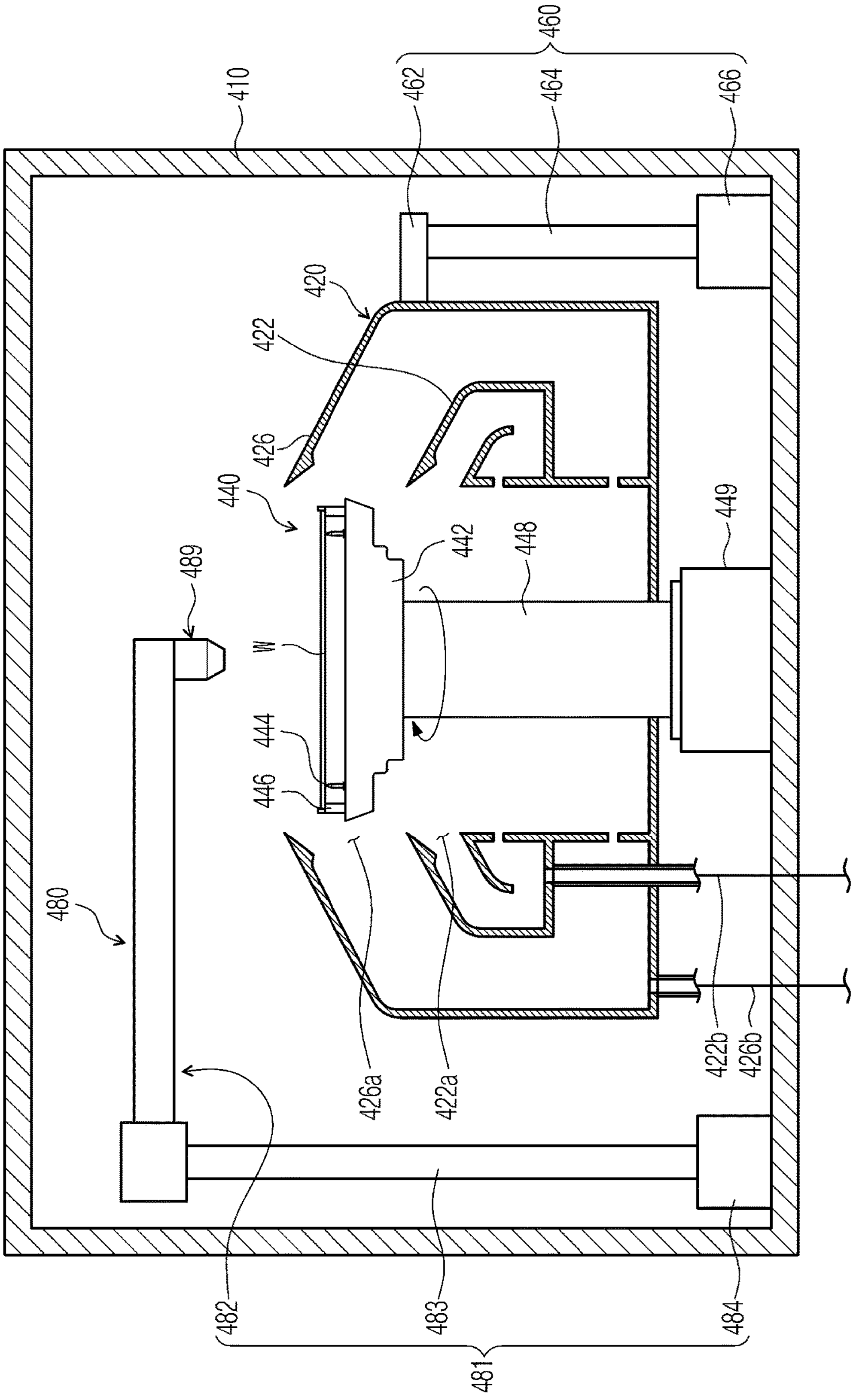
FIG. 9 schematically illustrates the single-type liquid treating chamber of FIG. 1.

FIG. 9 schematically illustrates a shape of the single-type liquid treating chamber of FIG. 1.

The single-type liquid treating chamber 230 may rotate the substrate W in a horizontal posture, but may supply the treating liquid to the rotating substrate W to treat the substrate W. The single-type liquid treating chamber 230 may treat the substrate W one by one. The treating liquid supplied from the single-type liquid treating chamber 230 may be an organic solvent. For example, the treating liquid supplied from the single-type liquid treating chamber 230 may be an isopropyl alcohol (IPA). In the single-type liquid treating chamber 230, the organic solvent may be supplied to the rotating substrate W, and the substrate W may be dried by rotating the substrate W. In contrast, the single-type liquid treating chamber 230 supplies the organic solvent to the rotating substrate W, and is transferred to the drying chamber 240 described later while the substrate W is wet with the organic solvent, so that the substrate W may be dried in the drying chamber 240.

The single-type liquid treating chamber 230 may include a housing 410, a treating container 420, a support unit 440, a lifting/lowering unit 460, and a liquid supply unit 480.

The housing 410 has a treating space 412 (i.e., an inner space of the housing 410) therein. The housing 410 may have a cylindrical shape having a space therein. The treating space 412 of the housing 410 may be provided with a treating container 420, a support unit 440, a lifting/lowering unit 460, and a liquid supply unit 480. The housing 410 may have a rectangular shape when viewed from a front cross section. However, the inventive concept is not limited thereto, and the housing 410 may be transformed into various shapes that may have a treating space 412.

The treating container 420 has a cylindrical shape with an open top. The treating container 420 has an inner recollecting container 422 and an outer recollecting container 426. Each of the recollecting containers 422 and 426 recollects different treating liquids from among the treating liquids used in the process. The inner recollecting container 422 is provided in an annular ring shape surrounding the support unit 440, and the outer recollecting container 426 is provided in an annular ring shape surrounding the inner recollecting container 426. The inner space 422*a* of the inner recollecting container 422 function as the first inlet 422*a* through which the treating liquid flows into the inner recollecting container 422. A space 426*a* between the inner recollecting container 422 and the outer recollecting container 426 functions as a second inlet 426*a* through which the treating liquid flows into the outer recollecting container 426. According to an embodiment, each of the inlets 422*a* and 426*a* may be positioned at different heights. The recollecting lines 422*b* and 426*b* are connected below the bottom surfaces of each of the recollecting containers 422 and 426. The treating liquids which are introduced into each of the recollecting containers 422 and 426 may be provided to an outer treating liquid regeneration system (not shown) through the recollecting lines 422*b* and 426*b* and reused.

The support unit 440 supports the substrate Win the treating space 412. The support unit 440 supports and rotates the substrate W during the process. The support unit 440 has a support plate 442, a support pin 444, a chuck pin 446, and rotation driving members 448 and 449.

The support plate 442 is generally provided in a circular plate shape and has a top surface and a bottom surface. The bottom surface has a smaller diameter than the top surface. That is, the support plate 442 may have a shape of a wide top surface and a narrow bottom surface. The top and bottom surfaces are positioned so that their central axes coincide with each other. In addition, a heating means (not shown) may be provided on the support plate 442. The heating means provided to the support plate 442 may heat the substrate W placed on the support plate 442. The heating means may generate a heat. The heat generated by the heating means may be warm or cold. The heat generated by the heating means may be transferred to the substrate W placed on the support plate 442. In addition, the heat transferred to the substrate W may heat the treating liquid supplied to the substrate W. The heating means may be a heater and/or a cooling coil. However, the inventive concept is not limited thereto, and the heating means may be variously modified into a known device.

A plurality of support pins 444 are provided. The support pins 444 are disposed to be spaced apart from an edge of the top surface of the support plate 442 at a predetermined interval and upwardly protrude from the support plate 442. The support pins 444 are disposed to have an annular ring shape as a whole by a combination with each other. The support pin 444 supports a rear edge of the substrate W such that the substrate W is spaced apart from a top surface of the support plate 442 by a predetermined distance.

A plurality of chuck pins 446 are provided. The chuck pin 446 is disposed to be farther from a center of the support plate 442 than the support pin 444. The chuck pin 446 is provided to upwardly protrude from the top surface of the support plate 442. The chuck pin 446 supports a side of the substrate W so that the substrate W does not deviate from a correct position in a lateral direction when the support plate 442 is rotated. The chuck pin 446 is provided to be able to move linearly between an outer position and an inner position along a radial direction of the support plate 442. The outer position is a position far from a center of the support plate 442 compared to the inner position. If the substrate W is loaded or unloaded on the support plate 442, the chuck pin 446 is positioned at the outer position, and if the process is performed on the substrate W, the chuck pin 446 is positioned at the inner position. The inner position is a position at which the side parts of the chuck pin 446 and the substrate W contact each other, and the outer position is a position at which the chuck pin 446 and the substrate W are spaced apart from each other.

The rotation driving members 448 and 449 rotate the support plate 442. The support plate 442 may be rotated about a magnetic center axis by the rotation driving members 448 and 449. The rotation driving members 448 and 449 include a support shaft 448 and a driving unit 449. The support shaft 448 has a cylindrical shape facing a fourth direction 16. A top end of the support shaft 448 is fixedly coupled to the bottom surface of the support plate 442. According to an embodiment, the support shaft 448 may be fixedly coupled to the center of the bottom surface of the support plate 442. The driving unit 449 provides a driving force to rotate the support shaft 448. The support shaft 448 may be rotated by the driving unit 449, and the support plate 442 may be rotated together with the support shaft 448.

The lifting/lowering unit 460 linearly moves the treating container 420 in the vertical direction. As the treating container 420 moves up and down, a relative height of the treating container 420 with respect to the support plate 442 is changed. In the lifting/lowering unit 460, the treating container 420 is lowered so that the support plate 442 protrudes above the treating container 420 when the substrate W is loaded or unloaded on the support plate 442. In addition, if the process proceeds, a height of the treating container 420 is adjusted so that the treating liquid can flow into a preset recollecting container 422, 426 according to the type of the treating liquid supplied to the substrate W. For example, when the treatment liquid supplied by the liquid supply unit 480 is an organic solvent, the height of the treatment container 420 may be adjusted so that the treatment liquid flows into the outer recollecting container 426. When the treatment liquid supplied by the liquid supply unit 480 is chemical, the height of the treatment container 420 may be adjusted so that the treatment liquid flows into the inner recollecting container 422. The lifting/lowering unit 460 has a bracket 462, a moving shaft 464, and a driver 466. The bracket 462 is fixedly installed on an outer wall of the treating container 420, and the moving shaft 464, which is moved in the vertical direction by the driver 466, is fixedly coupled to the bracket 462. Selectively, the lifting/lowering unit 460 may move the support plate 442 in the vertical direction.

The liquid supply unit 480 may supply the treating liquid to the substrate W. The treating liquid may be an organic solvent, a chemical or a rinsing liquid described above. The organic solvent may be an isopropyl alcohol (IPA) liquid.

The liquid supply unit 480 may include a moving member 481 and a nozzle 489. The moving member 481 moves the nozzle 489 to a process position and a standby position. The process position is a position at which the nozzle 489 faces the substrate W supported by the support unit 440. According to an embodiment, the process position is a position at which the treating liquid is discharged to a top surface of the substrate W. Also, the process position also includes a first supply position and a second supply position. The first supply position may be a position closer to the center of the substrate W than the second supply position, and the second supply position may be a position including an end part of the substrate. Selectively, the second supply position may be a region adjacent to the end of the substrate. The standby position is defined as a position at which the nozzle 489 is out of the process position. According to an embodiment, the standby position may be a position at which the nozzle 489 stands by before or after a process treatment is completed on the substrate W.

The moving member 481 includes an arm 482, a support shaft 483, and a driver 484. The support shaft 483 is positioned on a side of the treating container 420. The support shaft 483 has a rod shape in which a lengthwise direction thereof faces the fourth direction. The support shaft 483 is provided to be rotatable by the driver 484. The support shaft 483 is provided to be movable up and down. The arm 482 is coupled to the top end of the support shaft 483. The arm 482 vertically extends from the support shaft 483. A nozzle 489 is coupled to an end of the arm 482. As the support shaft 483 is rotated, the nozzle 489 may swing together with the arm 482. The nozzle 489 may be swing-moved to the process position and the standby position. Selectively, the arm 482 may be provided to be forwardly and backwardly movable in the lengthwise direction thereof. A path through which the nozzle 489 moves when viewed from above may coincide with the central axis of the substrate W at the process position.

Figure 10:
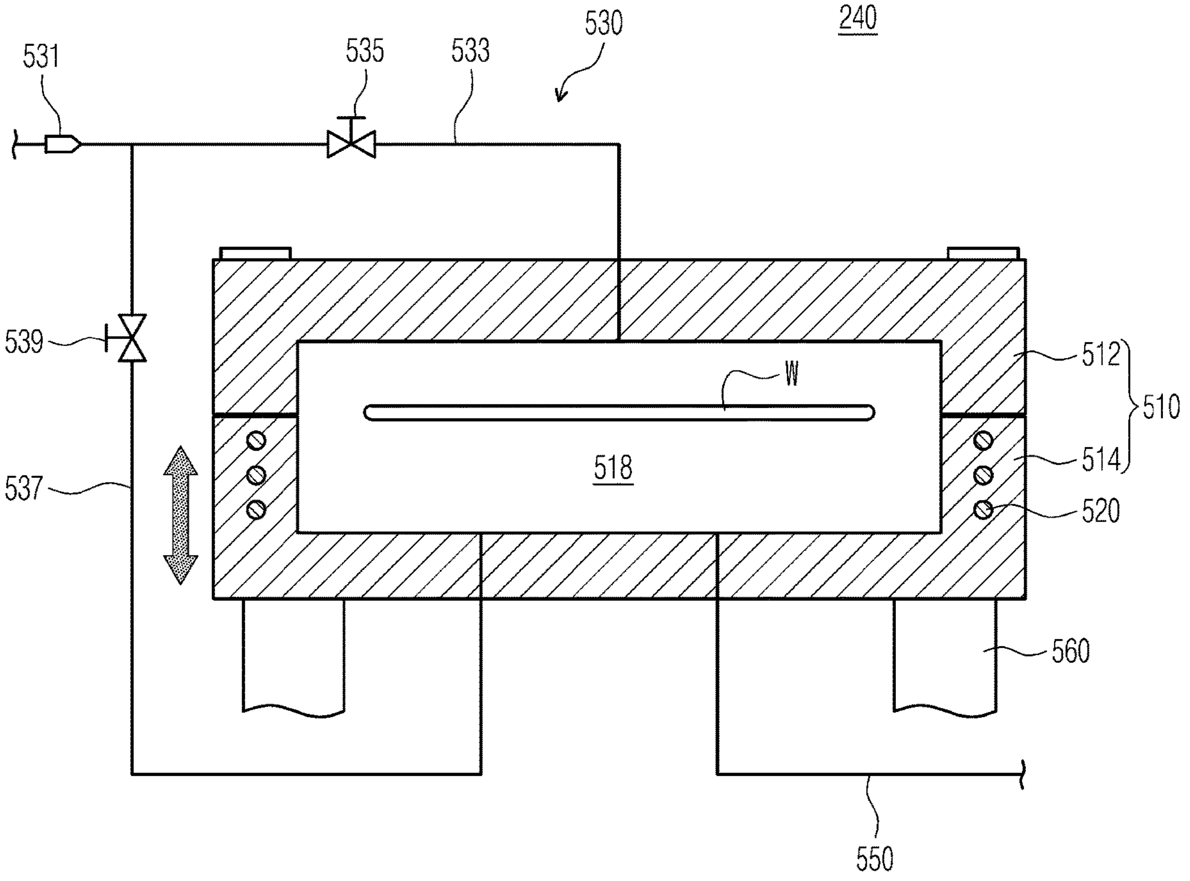
FIG. 10 schematically illustrates a single-type drying chamber of FIG. 1.

FIG. 10 schematically illustrates a shape of the single-type drying chamber of FIG. 1.

A plurality of single-type drying chambers 240 may be provided. The plurality of single-type drying chambers 240 may be provided and stacked in the vertical direction. The single-type drying chamber 240 may treat the substrate W using a supercritical fluid. The single-type drying chamber 240 may be a supercritical chamber in which one substrate W is dried in a single-type manner. The single-type drying chamber 240 may be a supercritical chamber in which the substrate W is dried using the supercritical fluid.

The single-type drying chamber 240 may remove the treating liquid remaining on the substrate W by using the drying fluid Gin a supercritical state. The single-type drying chamber 240 may be a supercritical chamber which removes the treating liquid (e.g., a rinsing liquid or an organic solvent) remaining on the substrate W using a supercritical fluid. For example, the single-type drying chamber 240 may perform a drying process of removing the organic solvent remaining on the substrate W using a supercritical carbon dioxide ($CO_2$).

The single-type drying chamber 240 may include a body 510, a heating member 520, a fluid supply unit 530, a fluid exhaust unit 550, and a lifting/lowering member 560. The body 510 may have an inner space 518 in which the substrate W is treated. The body 510 may provide an inner space 518 in which the substrate W is treated. The body 510 may provide the inner space 518 in which the substrate W is dried by the drying fluid Gin a supercritical state.

The body 510 may include a top body 512 and a bottom body 514. The top body 512 and the bottom body 514 may be combined with each other to form the inner space 518. The substrate W may be supported in the inner space 518. For example, the substrate W may be supported by a support member (not shown) in the inner space 518. The support member may be configured to support a bottom surface of an edge region of the substrate W. Any one of the top body 512 and the bottom body 514 may be coupled to the lifting/lowering member 560 to be moved in the vertical direction. For example, the bottom body 514 may be coupled to the lifting/lowering member 560 to be moved in the vertical direction by the lifting/lowering member 560. Accordingly, the inner space 518 of the body 510 may be selectively sealed. In the aforementioned example, the bottom body 514 is coupled with the lifting/lowering member 560 to move in the vertical direction as an example, but the inventive concept is not limited to it. For example, the top body 512 may be coupled to the lifting/lowering member 560 to move in the vertical direction.

The heating member 520 may heat the drying fluid G supplied to the inner space 518. The heating member 520 may increase the temperature of the inner space 518 of the body 510 to phase-change the drying fluid G supplied to the inner space 518 into a supercritical state. In addition, the heating member 520 may increase the temperature of the inner space 518 of the body 510 so that the drying fluid Gin the supercritical state supplied to the inner space 518 remains in the supercritical state.

In addition, the heating member 520 may be embedded within the body 510. For example, the heating member 520 may be embedded in any one of the top body 512 and the bottom body 514. For example, the heating member 520 may be provided within the bottom body 514. However, the inventive concept is not limited thereto, and the heating member 520 may be provided at various positions capable of increasing a temperature of the inner space 518. Also, the heating member 520 may be a heater. However, the inventive concept is not limited thereto, and the heating member 520 may be variously modified into a known device capable of increasing the temperature of the inner space 518.

The fluid supply unit 530 may supply the drying fluid G to the inner space 518 of the body 510. The drying fluid G supplied by the fluid supply unit 530 may include a carbon dioxide $CO_2$. The fluid supply unit 530 may include a fluid supply source 531, a first supply line 533, a first supply valve 535, a second supply line 537, and a second supply valve 539.

The fluid supply source 531 may store and/or supply the drying fluid G supplied to the inner space 518 of the body 510. The fluid supply source 531 may supply the drying fluid G to the first supply line 533 and/or the second supply line 537. For example, a first supply valve 535 may be installed in the first supply line 533. In addition, a second supply valve 539 may be installed on the second supply line 537. The first supply valve 535 and the second supply valve 539 may be on/off valves. Depending on the on/off of the first supply valve 535 and the second supply valve 539, the drying fluid G may selectively flow through the first supply line 533 or the second supply line 537.

In the above-described example, the first supply line 533 and the second supply line 537 are connected to one fluid supply source 531, but are not limited thereto. For example, a plurality of fluid supply sources 531 may be provided, the first supply line 533 may be connected to one of the plurality of fluid supply sources 531, and the second supply line 537 may be connected to the other of the fluid supply sources 531.

In addition, the first supply line 533 may be a top supply line which supplies a drying gas from above the inner space 518 of the body 510. For example, the first supply line 533 may supply the drying gas in a direction from a top to a bottom of the inner space 518 of the body 510. For example, the first supply line 533 may be connected to the top body 512. In addition, the second supply line 537 may be a bottom supply line which supplies drying the gas from below the inner space 518 of the body 510. For example, the second supply line 537 may supply the drying gas in a direction from the bottom to the top to the inner space 518 of the body 510. For example, the second supply line 537 may be connected to the bottom body 514.

The fluid exhaust unit 550 may exhaust the drying fluid G from the inner space 518 of the body 510.

Referring back to FIG. 1, the substrate W treated in the single-treating chamber may be transferred to the buffer unit 250 by the first transfer robot 222. The buffer unit 250 may be disposed between the first transfer chamber 220 and the second transfer chamber 260. The buffer unit 250 may be disposed between the single-type treating chamber and the second load port unit 270.

The buffer unit 250 may provide a space in which the substrate W is temporarily stored. For example, the buffer unit 250 may temporarily store the substrate W treated in the single-type liquid treating chamber 230 and/or the single-type drying chamber 240 which are single-type treating chambers. The buffer unit 250 may be a shelf capable of temporarily storing the plurality of substrates W.

The second transfer chamber 260 may be disposed between the buffer unit 250 and the second load port unit 270. A second transfer robot 262 may be provided in the second transfer chamber 260. The second transfer robot 262 may complete the treatment and transfer the substrate W stored in the buffer unit 250 to the transfer container F.

The hand of the second transfer robot 262 may be a single-type hand for transferring the substrate W one by one. A transfer hand of the second transfer robot 262 may be provided to be movable along the first direction X, the second direction Y, and the third direction Z. In addition, the transfer hand of the second transfer robot 262 may be rotatably provided with the third direction Z as a rotation axis.

The second load port unit 270 may include at least one load port. A transfer container F capable of storing a plurality of substrates W may be placed on the load port of the second load port unit 270. For example, the transfer container F placed in the second load port unit 270 may store substrates W treated by the first process treating unit 100 and the second process treating unit 200. The transfer container F placed in the second load port unit 270 may store only the substrates W on which a treatment has been completed in the first process treating unit 100 and the second process treating unit 200. That is, the second load port unit 270 may perform a function of unloading the treated substrate W from the substrate treating apparatus.

The second transfer robot 262 described above may take the treated substrate W into the container F placed in the load port of the second load port unit 270. The container F may be transferred to an outside of the substrate treating apparatus 10 by the above-described article transfer apparatus (e.g., OHT).

The controller 600 may control the substrate treating apparatus 10. For example, the controller 600 may control components of the substrate treating apparatus 10. For example, the controller 600 may control the substrate treating apparatus 10 so that the substrate treating apparatus 10 may perform a process of treating the substrate W.

For example, the controller 600 may control at least one of the first load port unit 110, the index chamber 120, the transfer unit 130, the batch-type treating unit 140, the posture change portion 150, the buffer chamber 210, the first transfer chamber 220, the single-type liquid treating chamber 230, the single-type drying chamber 240, and the second transfer chamber 260.

The controller 600 may comprise a process controller consisting of a microprocessor (computer) that executes a control of the substrate treating apparatus 10, a user interface such as a keyboard via which an operator inputs commands to manage the substrate treating apparatus 10, and a display showing the operation situation of the substrate treating apparatus, and a memory unit storing a treating recipe, i.e., a control program to execute treating processes of the substrate treating apparatus 10 by controlling the process controller or a program to execute components of the substrate treating apparatus 10 according to data and treating conditions. In addition, the user interface and the memory unit may be connected to the process controller. The treating recipe may be stored in a storage medium of the storage unit, and the storage medium may be a hard disk, a portable disk, such as a CD-ROM or a DVD, or a semiconductor memory, such as a flash memory.

Figure 11:
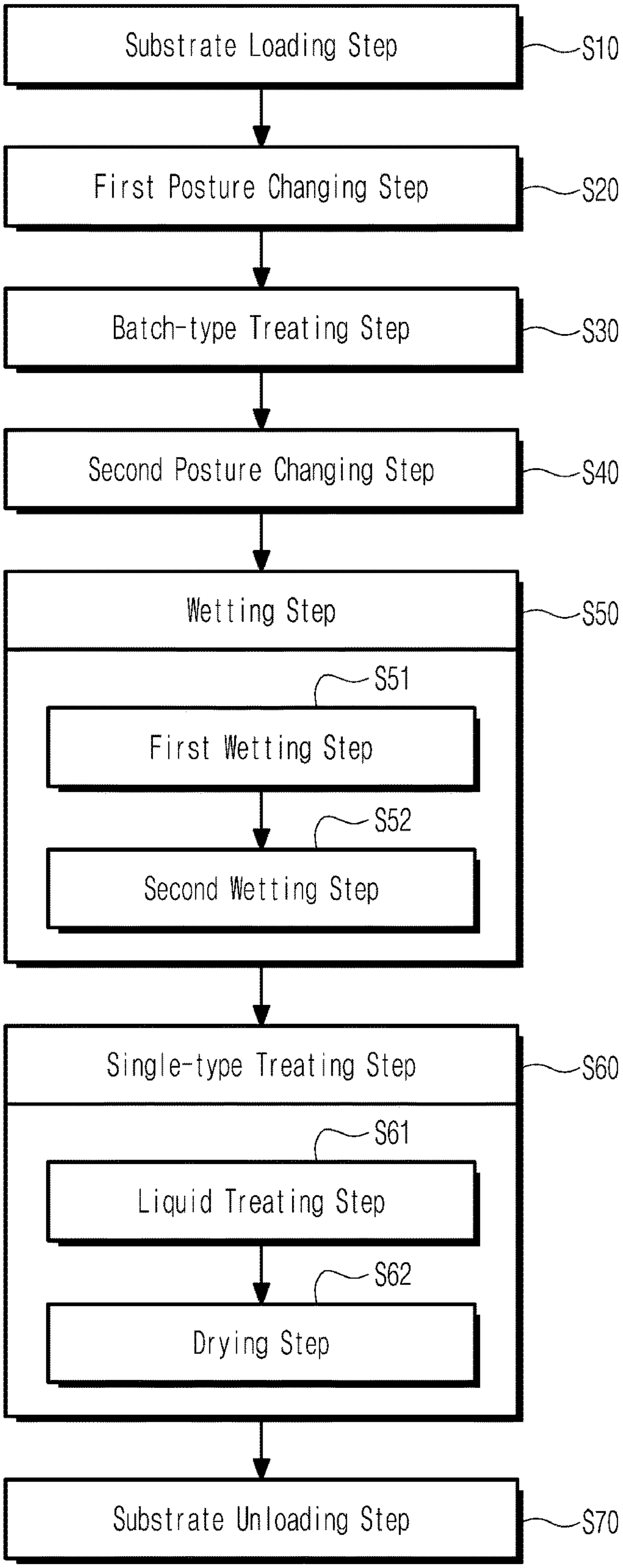
FIG. 11 is a flowchart illustrating a substrate treating method according to an embodiment of the inventive concept.

FIG. 11 is a flowchart illustrating a substrate treating method according to an embodiment of the inventive concept.

Referring to FIG. 11, the substrate treating method according to an embodiment of the inventive concept may include a substrate loading step S10, a first posture changing step S20, a batch-type treating step S30, a second posture changing step S40, a wetting step S50, a single-type treating step S60, and a substrate unloading step S70.

In the substrate loading step S10, a so-called substrate W in an untreated state, which requires a treatment, may be loaded on the substrate treating apparatus 10. In the substrate loading step S10, the transfer container F may be placed on the first load port unit 110.

The substrate W stored in the transfer container F may be taken out by the index robot 122 and transferred to the storage container C.

In the first posture change step S20, the posture of the substrate W may be changed from a horizontal posture to a vertical posture. In the first posture change step S20, the posture of the substrate W may be changed as the storage container C rotates in the first direction X around the axis by the posture change unit 124. The posture change unit 124 may have a rotation shaft capable of rotating the storage container C in the first direction X as an axis. In the first posture change step S20, postures of the plurality of substrates W may be changed at once.

The substrate W changed to the vertical posture may be transferred to the first batch-type treating unit 141 by the first transfer unit 132.

In the batch-type treating step S30, a liquid treatment may be performed on the plurality of substrates W in the vertical posture. In the batch-type treating step S30, the substrates W may be transferred to at least one of the batch-type treating baths 141-B1 to 143-B2 to perform the liquid treatment on the substrate W. The batch-type treating step S30 may be performed in a manner in which the substrate is pretreated at the first batch-type treating unit 141 and post-treated at the second batch-type treating unit 142 or the third batch-type treating unit 143.

For example, the substrate W transferred to the first batch-type treating unit 141 may be liquid-treated in the 1-1 batch-type treating bath 141-B1 and/or the 1-2 batch-type treating bath 141-B2. The substrate W which is liquid-treated in the 1-1 batch-type treating bath 141-B1 and/or the 1-2 batch-type treating bath 141-B2 may be transferred to any one of the treating units selected from the second batch-type treating unit 142 or the third batch-type treating unit 143. In the 1-1 batch-type treating bath 141-B1, the substrate W may be treated with a chemical such as a DSP (an embodiment of a first chemical), and in the 1-2 batch-type treating bath 141-B2, the substrate W may be treated with a chemical such as a DHF (an embodiment of a second chemical).

For example, if the substrate W is transferred to the second batch-type treating unit 142, the substrate W may be treated first by a chemical containing a phosphoric acid (an embodiment of a third chemical) in the 2-1 batch-type treating unit 142-B1, and then by a rinsing liquid containing a water in the 2-2 batch-type treating unit 142-B2.

The rinse-treated substrates W may be transferred to the posture change treating bath 151 by the second transfer unit 134.

The second posture changing step S40 may be performed by the posture change portion 150. The second posture changing step S40 may include a grip step of gripping the substrate W and a rotation step of changing the posture of the substrate W. In the second posture changing step S40, the posture of the substrate W may be changed one by one.

Figure 12:
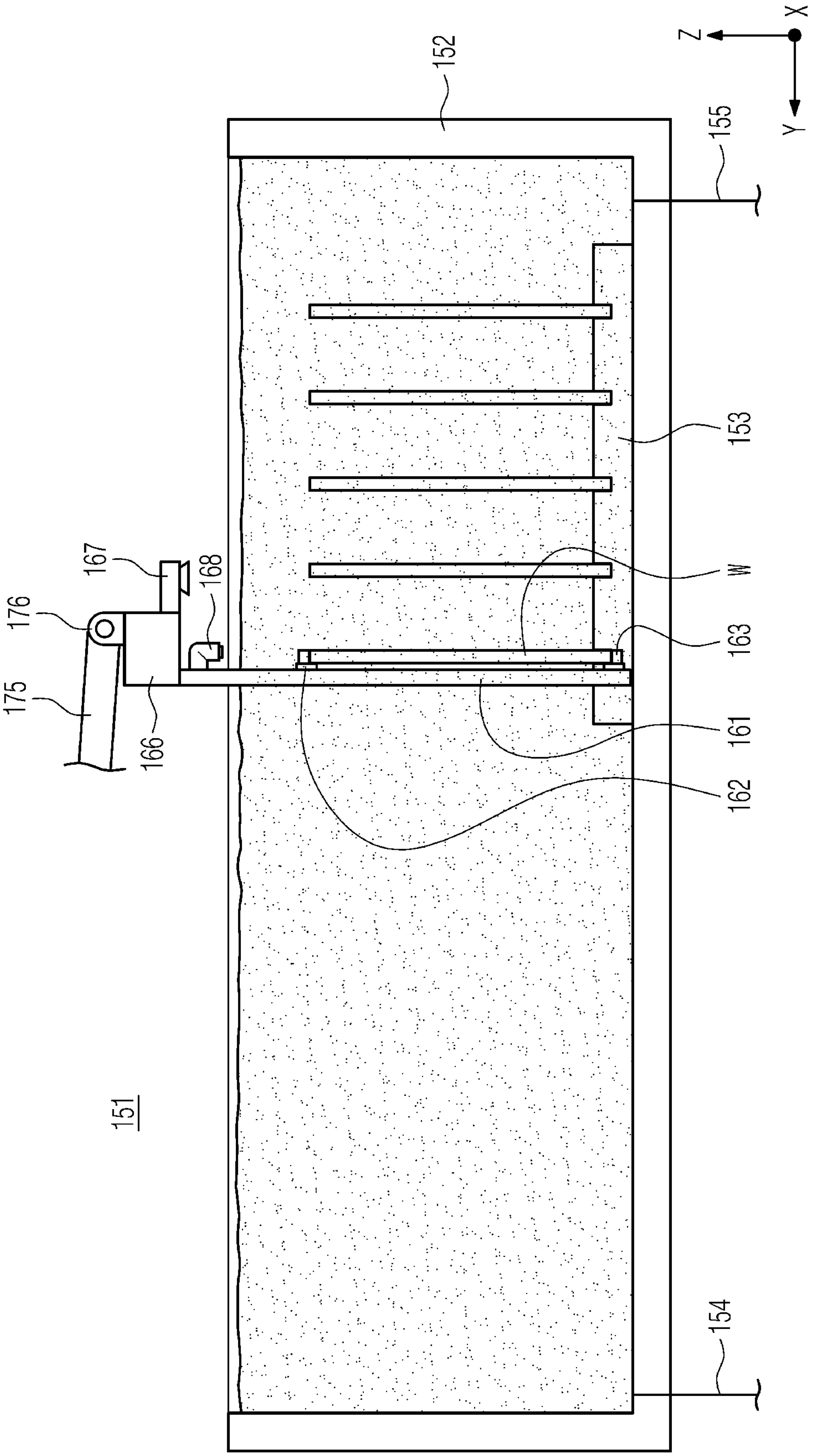
FIG. 12 and FIG. 13 illustrate the posture change robot changing a posture of the substrate from a vertical posture to a horizontal posture in a second posture changing step of FIG. 11.

For example, in the grip step during the second posture changing step S40, as shown in FIG. 12, the hand 156-H may approach the substrate W of any of the substrates W supported in the vertical posture by the support member 153. The hand 156-H may be moved so that the substrate W may be positioned between the first guide unit 162 and the second guide unit 163. If the substrate W is positioned between the first guide unit 162 and the second guide unit 163, the chucking body 165 may move to a chucking position and grip the substrate W.

If the hand 156-H grips the substrate W, the substrate W can be upwardly moved so that the substrate W can escape the support groove formed in the support member 153.

Figure 13:
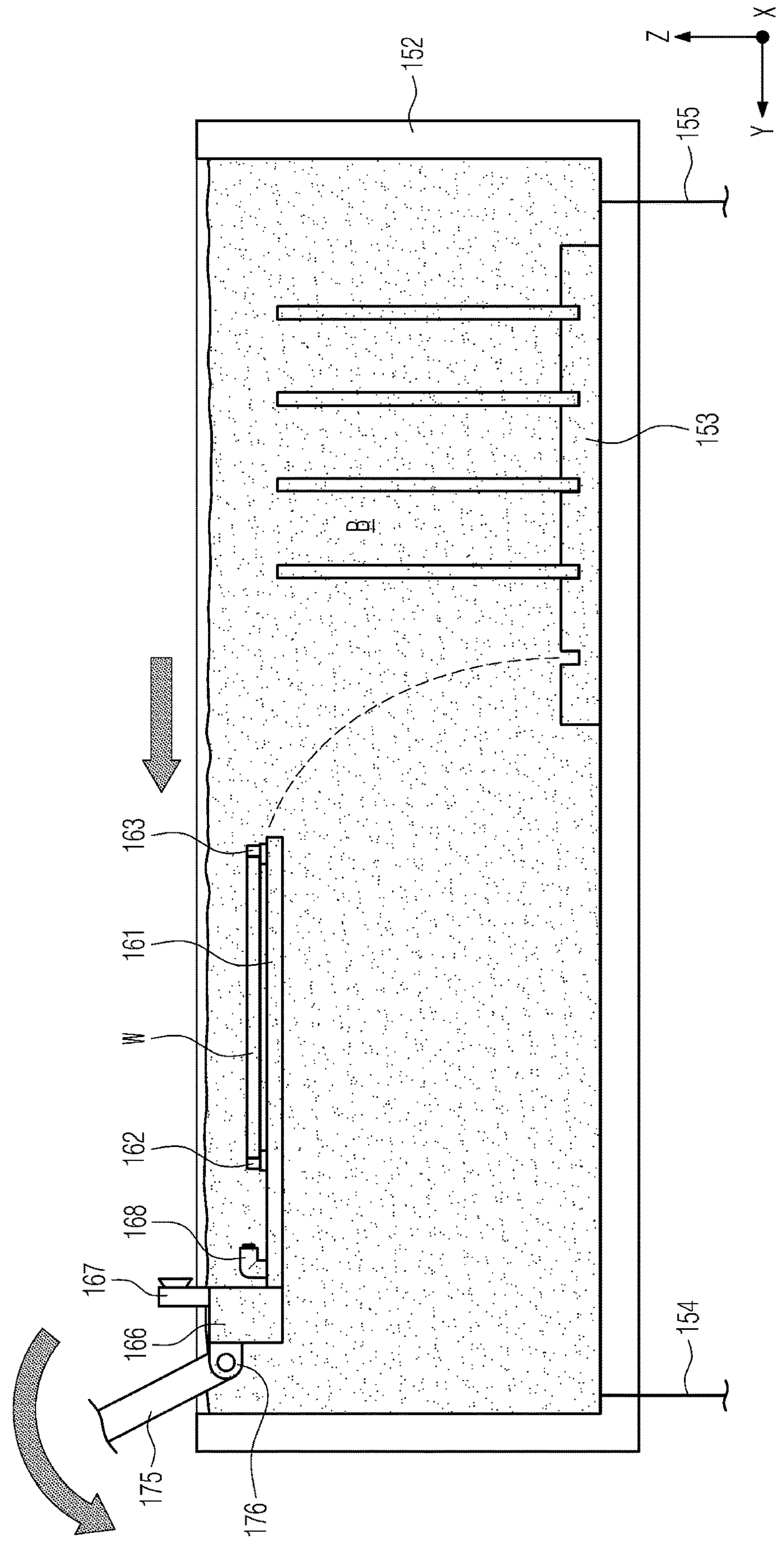

Then, as illustrated in FIG. 13, in the rotation step of the second posture changing step S40, a position of the substrate W may be changed by linearly moving the substrate W in a direction (e.g., horizontal direction) while rotating the substrate W based on an axis of the fastening body 166 being rotated. That is, in the rotation step, while the hand 156-H of the posture change robot 156 rotates based on an axis, the hand 156-H may move linearly in the horizontal direction. In this case, an end of the substrate W may change its posture from the vertical posture to the horizontal posture while being immersed in the treating liquid L while drawing a virtual curve (e.g., a cut parabola). In addition, the rotation of the substrate W may be performed in a direction in which an end of the substrate W moves away from the hand 156-H.

In addition, a difference between a time point at which the rotation of the substrate W is terminated and a time point at which a linear movement of the substrate W is terminated may be less than or equal to a set time. For example, the two time points may be the same time points. That is, as a linear movement of the substrate W ends, the rotation of the substrate W by the fastening body 166 may all be terminated.

In addition, while the substrate W is gripped and the substrate W rotates, the vision member 167 may not be immersed in the treating liquid L. That is, the vision member 167 may be installed at a position which is not immersed in the treating liquid L stored in the posture change treating bath 151. Accordingly, it is possible to minimize a problem that the vision member 167 is damaged by the treating liquid L.

If the posture of the substrate W is changed while the substrate W is immersed in the treating liquid L, the substrate W may be damaged by a resistance by the treating liquid L. However, if the substrate W is immersed in the treating liquid L and the posture is changed together with a rotation, it is possible to suppress a transmission of resistance by the treating liquid L to the substrate W as much as possible. In addition, if the posture of the substrate W is changed by removing the substrate W from the treating liquid L (i.e., exposed to an air), a water mark may be generated on the substrate W because a wettability of the substrate W cannot be maintained, and this problem can be minimized by changing the posture of the substrate W immersed in the treating liquid L.

After the second posture changing step S40 is performed, the wetting step S50 may be performed. The wetting step S50 may be performed between the second posture changing step S40 and the single-type treating step S60. The wetting step S50 may be performed by the posture change robot 156 and/or the buffer chamber 210. In the wetting step S50, a natural drying of the substrate W may be prevented by spraying the wetting liquid to the substrate W exposed to the outside away from the treating liquid L. The wetting liquid may be the same kind of liquid as the treating liquid L stored in the aforementioned posture change treating bath 151.

In addition, the wetting step S50 may include a first wetting step S51 performed by the posture change robot 156 and a second wetting step S52 performed by the buffer chamber 210.

Figure 14:
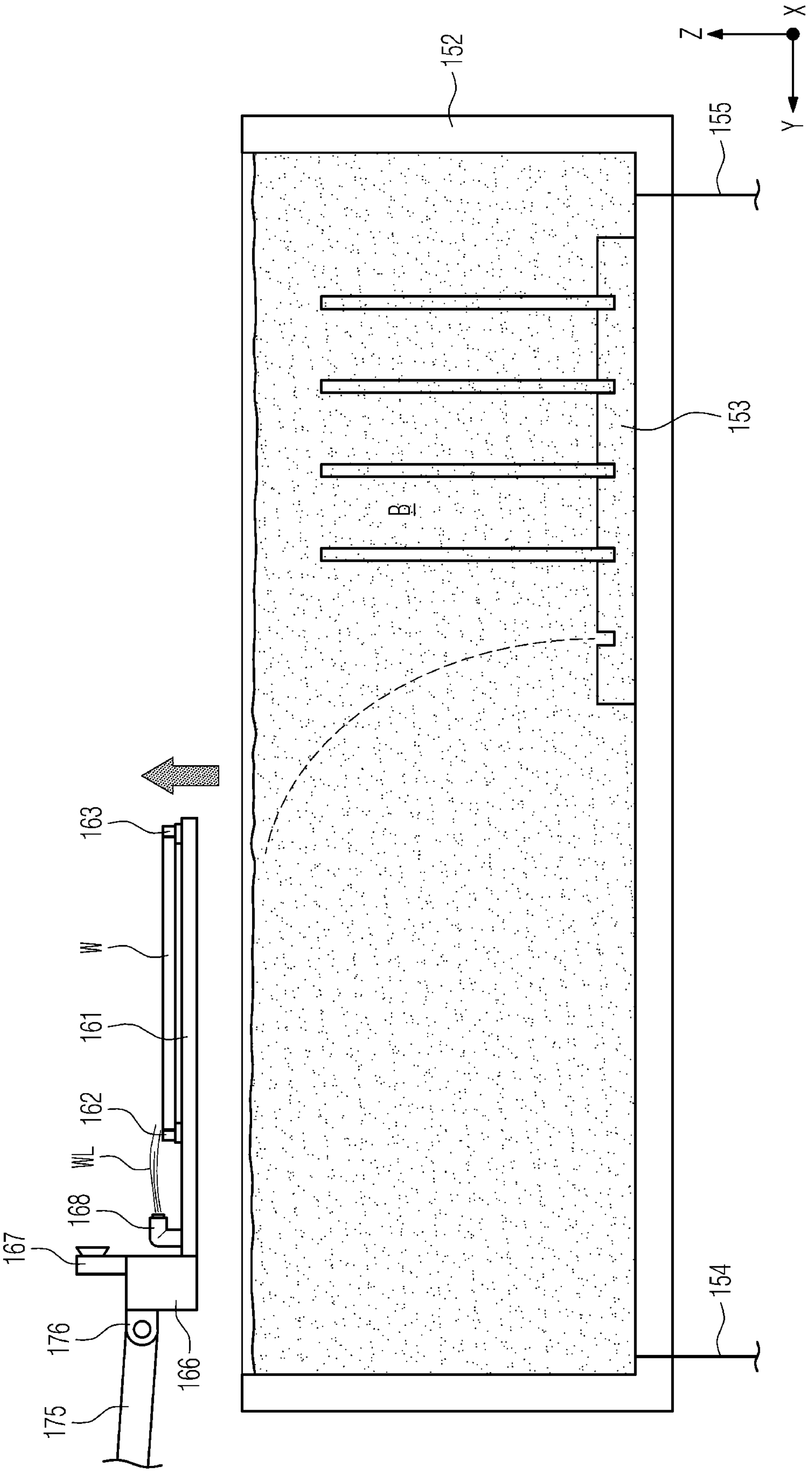
FIG. 14 illustrates the posture change robot performing a first wetting step of FIG. 11.
Figure 15:
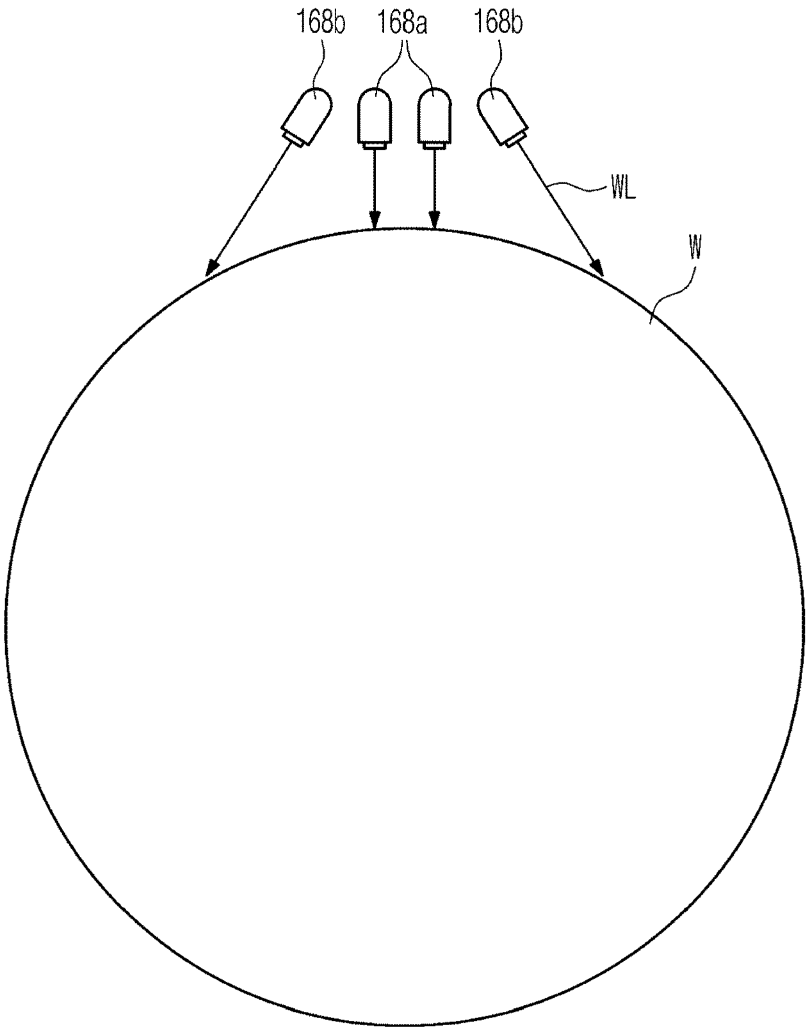
FIG. 15 is a top view illustrating a liquid supply member supplying a wetting liquid in the first wetting step of FIG. 11.
Figure 16:
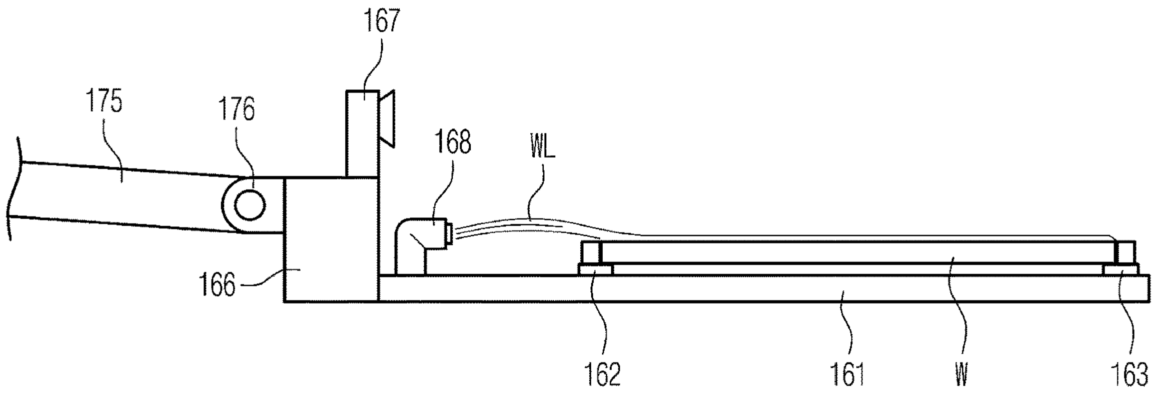
FIG. 16 is a side view illustrating the liquid supply member supplying the wetting liquid in the first wetting step of FIG. 11.

The first wetting step S51 may be performed by the posture change robot 156. Referring to FIG. 14, if the posture change of the substrate W is completed, the posture change robot 156 may upwardly move the substrate W so that the substrate W is away from the treating liquid L stored in the posture change treating bath 151. If the substrate W deviates from the treating liquid L, the liquid supply member 168 may supply the wetting liquid WL. In this case, as shown in FIG. 15 and FIG. 16, the wetting liquid WL may be supplied to a first region and a second region, which are edge regions of the substrate W. The wetting liquid WL supplied to the edge region of the substrate W may flow along a top surface of the substrate W to form a liquid film on the top surface of the substrate W. If the wetting liquid WL flows along the edge region of the substrate W to form the liquid film, a splashing phenomenon of the wetting liquid WL is suppressed as much as possible, so that the substrate W can be treated more efficiently.

The posture change robot 156 may take the substrate W on which the wetting state is maintained by the wetting liquid WL into the buffer chamber 210.

Figure 17:
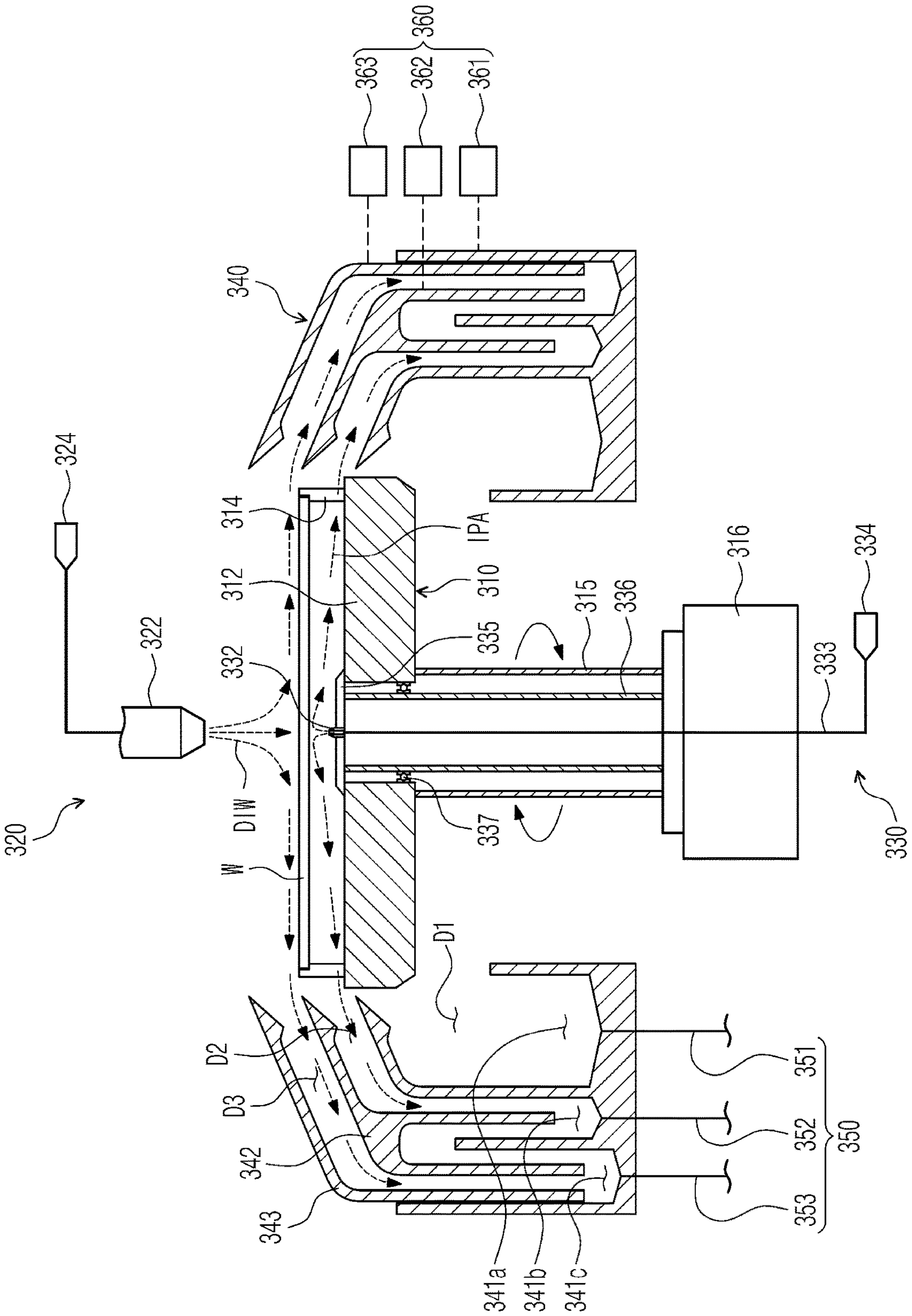
FIG. 17 illustrates the buffer chamber performing a second wetting step of FIG. 11.

The second wetting step S52 may be performed by the buffer chamber 210. Referring to FIG. 17, the substrate W taken into the buffer chamber 210 may be supported by a chuck 310. The substrate W supported by the chuck 310 may be supported and/or chucked by the support pin 314. In addition, the lifting/lowering driver 360 may lift/lower the cup 340 to adjust a height of a first recollecting path D1 and a height of a second recollecting path D2.

Thereafter, the chuck 310 may rotate the substrate W. If the chuck 310 is rotated, the first liquid supply unit 320 may supply the first liquid DIW (referred to as the wetting liquid) to the top surface of the substrate W. Also, the second liquid supply unit 330 may supply the second liquid (IPA, referred to as a cleaning liquid) to the bottom surface of the substrate W. The first liquid DIW supplied and scattered to the substrate W may be drained to the outside of the buffer chamber 210 through the first recollecting path D1. In addition, the second liquid IPA may be drained to an outside of the buffer chamber 210 through the second recollecting path D2.

The first liquid DIW may be supplied to the top surface of the substrate W to form the liquid film on the substrate W. The second liquid IPA may be supplied to a bottom surface of the substrate W to clean the bottom surface of the substrate W. The second liquid IPA is supplied from the buffer chamber 210 to the bottom surface of the substrate W to clean the bottom surface of the substrate W to minimize a contamination of the hand of the first transfer robot 222 which takes the substrate W out of the buffer chamber 210 and transfers the substrate W to the single-type treating chamber 230. In addition, forming the liquid film by the first liquid (DIW, wetting liquid) on a patterned substrate W prevents the surface of the substrate W from being naturally dried to form a watermark or a lean phenomenon on the pattern formed on the substrate W occurring during a transfer of the substrate W to the single-type liquid treating chamber 230.

In the second wetting step S52, the controller 600 may control a driving of a hollow motor 316 so that a rotation speed of the chuck 310 is between 300 RPM and 500 RPM. If the rotation speed of the chuck 310 is excessively high, the liquid film of the wetting liquid may not be appropriately formed on the top surface of the substrate W, and thus the rotation speed of the chuck 310 is adjusted to 300 to 500 RPM according to an embodiment of the inventive concept. This is because if the rotation speed of the chuck 310 is lower than 300 RPM, the first liquid supplied to the substrate W may not be properly diffused on the substrate W, and if the rotation speed of the chuck 310 is greater than 500 RPM, the first liquid may not form the liquid film on the substrate W by excessively scattering from the substrate W.

In addition, in the second wetting step S52, the second liquid supplied to the bottom surface of the substrate W may be provided as a liquid having higher volatility than the first liquid. In order to minimize a contamination of the hand of the first transfer robot 222, the bottom surface of the substrate W is cleaned, but it may be appropriate for the first transfer robot 222 to transfer the substrate W in a dry state if possible. If the bottom surface of the substrate W is cleaned using the same kind of liquid (e.g., water) as the first liquid, the bottom surface of the substrate W may be cleaned, but it is difficult to dry appropriately the bottom surface of the substrate W. If the rotation speed of the chuck 310 is increased to dry the bottom surface of the substrate W, it may be difficult to form the liquid film on the top surface of the substrate W. According to an embodiment of the inventive concept, the first liquid is supplied to the top surface of the substrate W and the second liquid which is highly volatile is supplied to the bottom surface of the substrate W, so that the top part of the substrate W remains wet even at the same rotation speed of the chuck 310, but the bottom part of the substrate W is quickly volatilized and dried.

Figure 18:
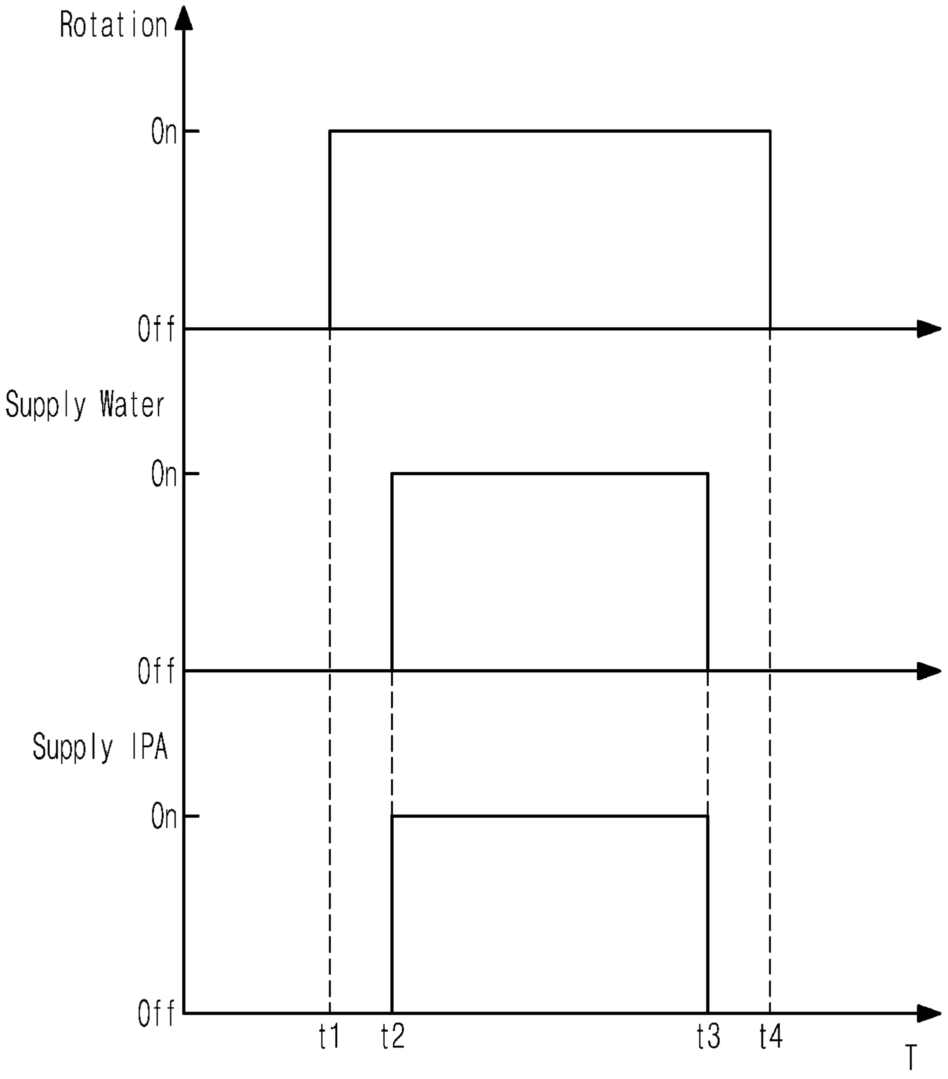
FIG. 18 is a graph schematically illustrating an embodiment of supply on and off times of a first liquid and a second liquid supplied to the substrate when performing the second wetting step of FIG. 17.
Figure 19:
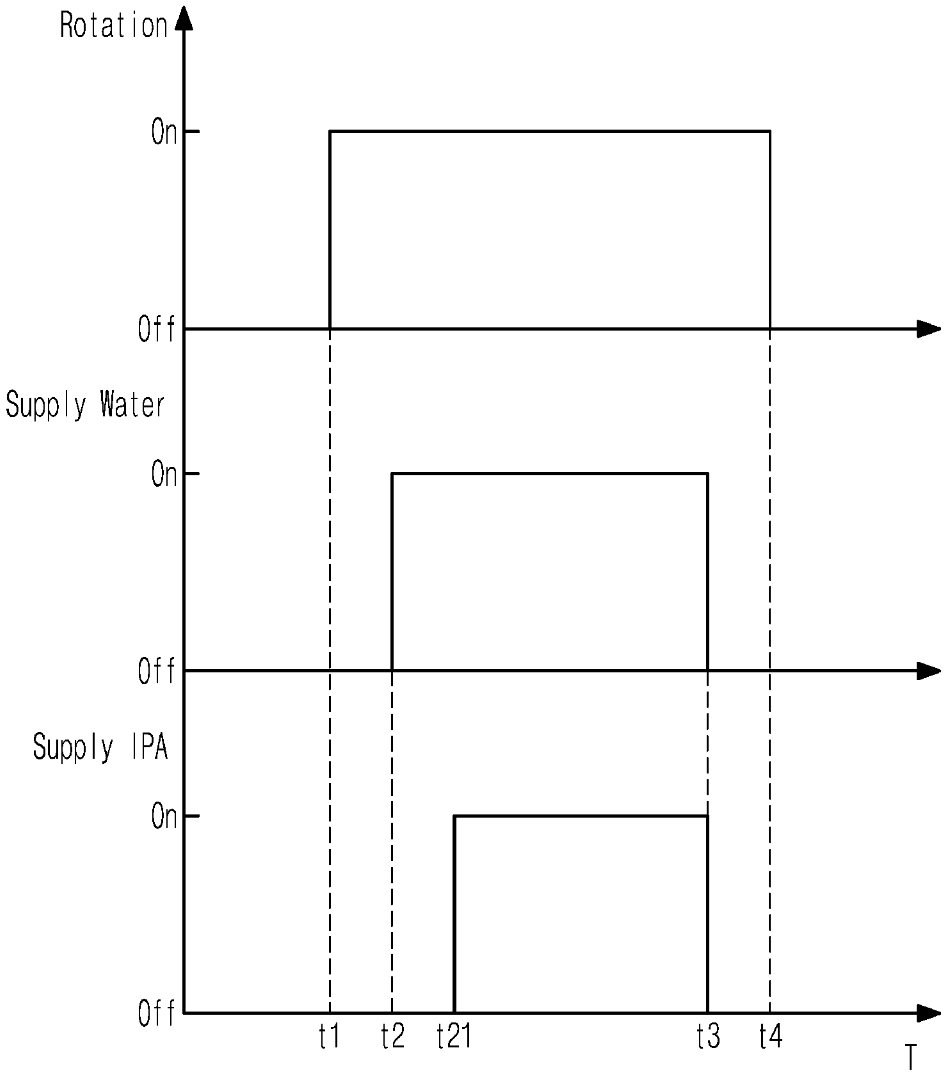
FIG. 19 is a graph schematically illustrating another embodiment of supply on and off times of the first liquid and the second liquid supplied to the substrate when performing the second wetting step of FIG. 17.

Also, as shown in FIG. 18, a supply of the first liquid and the second liquid may start at the same time, but as shown in FIG. 19, the first liquid supply unit 320 may start supplying the first liquid and the second liquid supply unit 330 may start supplying the second liquid after a set time has elapsed.

In addition, the controller 600 may control the buffer chamber 210, the single-type liquid treating chamber 230, and the single-type drying chamber 240 so that a treating time of the substrate W in the buffer chamber 210 is shorter than a treating time of the single-type liquid treating chamber 230 and/or the single-type drying chamber 240.

For example, the treating time of the substrate W in the buffer chamber 210 may be about 8 seconds to 12 seconds, and the treating time of the substrate W in the single-type liquid treating chamber 230 may be about 60 seconds to 70 seconds.

In the single-type treating step S60, a treatment may be performed on a single substrate W in a horizontal posture. The single-type treating step S60 may include a liquid treating step S61 and a drying step S62.

In the liquid treating step S61, the substrate W may be liquid-treated in a single-type-like manner. The liquid treating step S61 may be performed in the single-type liquid treating chamber 230 if the substrate W temporarily stored in the buffer chamber 210 is transferred to the single-type liquid treating chamber 230. An organic solvent such as an IPA may be supplied onto the substrate W at the liquid treating step S40.

In the drying step S62, the substrate W may be dried in a single-type manner. The drying step S62 may be performed in the drying chamber 240 if the liquid-treated substrate W in the liquid treating step S61 is transferred to the drying chamber 240. In the drying step S50, a supercritical treating fluid (e.g., supercritical carbon dioxide) may be supplied to the substrate W to remove an organic solvent, a wetting liquid, or a treating liquid L remaining on the substrate.

In some cases, the drying step S50 is not performed in the drying chamber 240, and the substrate W may be dried by rotating the substrate W at a high speed in the single-type liquid treating chamber 230 (so-called spin drying).

In the substrate unloading step S70 performed after the single-type treating step S60, the substrate W on which the single-type treating step S60 is performed may be transferred to the buffer unit 250, then transferred to the transfer container F placed on the second load port unit 270 by the second transfer robot 262 of the second transfer chamber 260, and the transfer container F placed on the second load port unit 270 may be gripped by a transfer apparatus such as an OHT to be unloaded from the substrate treating apparatus 10.

In addition, a transfer of the substrate W from the buffer chamber 210 to the single-type liquid treating chamber 230 may be performed by a third hand 222C-C1 among hands of the first transfer robot 222. In addition, the transfer of the substrate W from the single-type liquid treating chamber 230 to the single-type drying chamber 240 may be performed by a second hand 222C-B1 among the hands of the first transfer robot 222. In addition, the transfer of the substrate W from the single-type drying chamber 240 to the buffer unit 250 may be performed by the first hand 222C-A1. The hands of the first transfer robot 222 are installed at different heights, and a degree of cleanliness may be different according to an installed height. For example, a hand installed at a relatively high position may have an excellent cleanliness. Accordingly, in the inventive concept, the substrate W which has been treated in the single-type drying chamber 240 may be transferred by the first hand 222C-A1, the substrate W treated by the single-type liquid treating chamber 230 may be transferred by the second hand 222C-B1, and the substrate W in a state before a liquid treatment in the single-type liquid treating chamber 230 may be transferred by the third hand 222C-C1 to maintain a cleanness of the substrate W.

As described above, the substrate treating apparatus 10 according to an embodiment of the inventive concept may include both a batch-type treating unit 140 and a single-type liquid treating chamber 230. Accordingly, it is possible to have all the advantages of the batch liquid treating method and the single-type liquid treating method.

For example, the batch-type treating unit 140 can treat a plurality of substrates W at once, so that mass production of treating the substrate W is excellent, and a treatment uniformity between the substrates W is very high. In addition, if the pattern formed on the substrate W has a high aspect ratio, a chemical, a rinsing liquid, etc. can be supplied from the batch-type treating unit 140 for a supplement treatment for the untreated part (e.g., unetched part). In addition, the substrate W (for example, a wafer) wetted by an organic solvent supplied from the single-type liquid treating chamber 230 or the buffer chamber 210 may be transferred to the drying chamber 240 which dries the substrate W by supplying a supercritical fluid. The supercritical fluid has a high penetration force with respect to spaces between patterns formed on the substrate W and may dry the substrate W without rotating the substrate W, thereby minimizing an occurrence of the above-described pattern learning phenomenon. In addition, the substrate treating apparatus 10 of the inventive concept can perform all of the single-type liquid treating method, the batch-type liquid treating method, and substrate W drying method using a supercritical fluid, thereby improving a defect due to a particle, a falling, and a flowability. In addition, since the number of substrates W which can be treated by the batch-type treating unit 140 is relatively large, a large number of liquid treating chambers are not required, and therefore there is a benefit that a footprint of the substrate treating apparatus 10 can be reduced. In addition, by further including the single-type liquid treating chamber 230 as described above, it is possible to solve a problem of an abnormal growth of $SiO_2$ in the pattern on the substrate W which may occur if the substrate W is treated using only the batch-type treating unit 140.

In addition, it is essential to change the posture of the substrate W from the vertical posture to the horizontal posture if both the batch-type treating unit 140 and the single-type liquid treating chamber 230 are provided, as in the substrate treating apparatus 10 according to an embodiment of the inventive concept. Accordingly, the substrate treating apparatus 10 according to an embodiment of the inventive concept is equipped with the posture change robot 156 to change the posture of the substrate W from the vertical posture to the horizontal posture. At this time, the posture of the substrate W is changed while the substrate W is immersed in the treating liquid L, so that a wettability of the substrate W can be maintained as much as possible (otherwise, the substrate W may be dried to generate a water mark).

Figure 20:
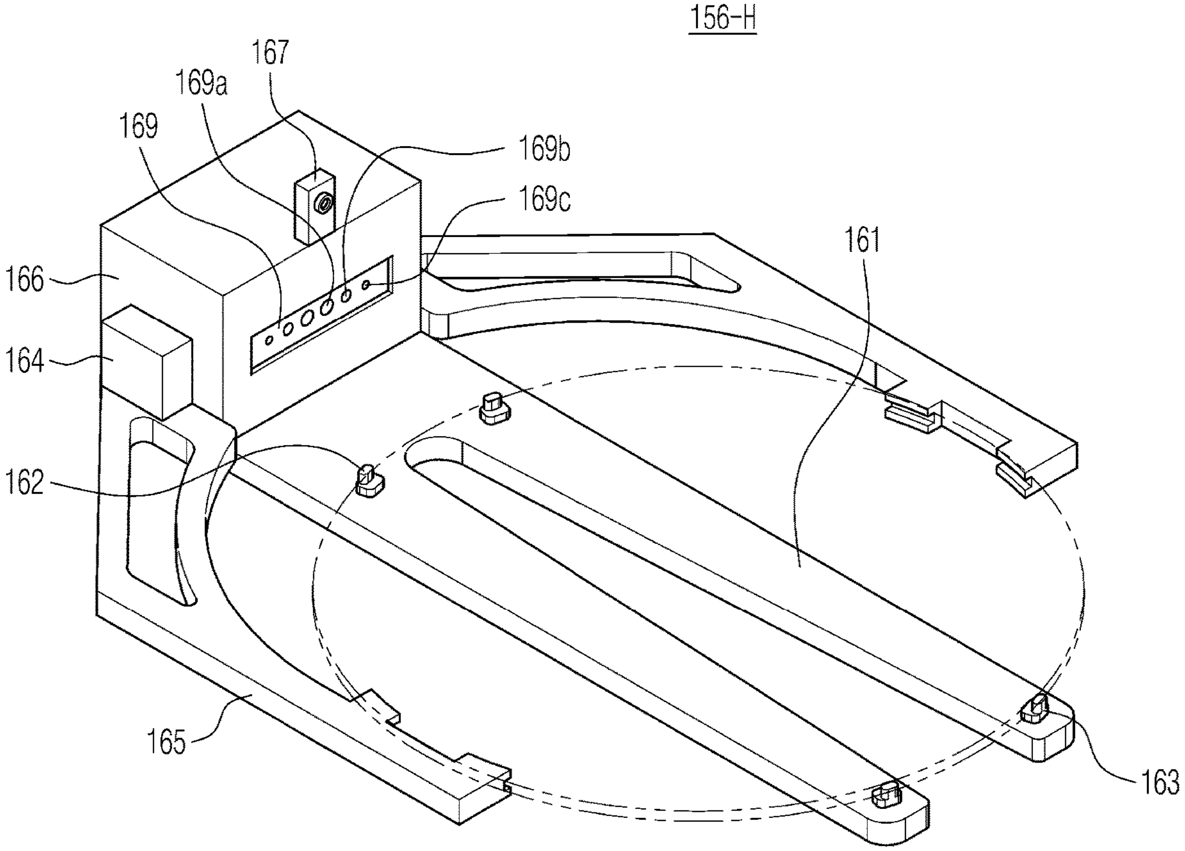
FIG. 20 illustrates the hand according to another embodiment of the inventive concept.
Figure 21:
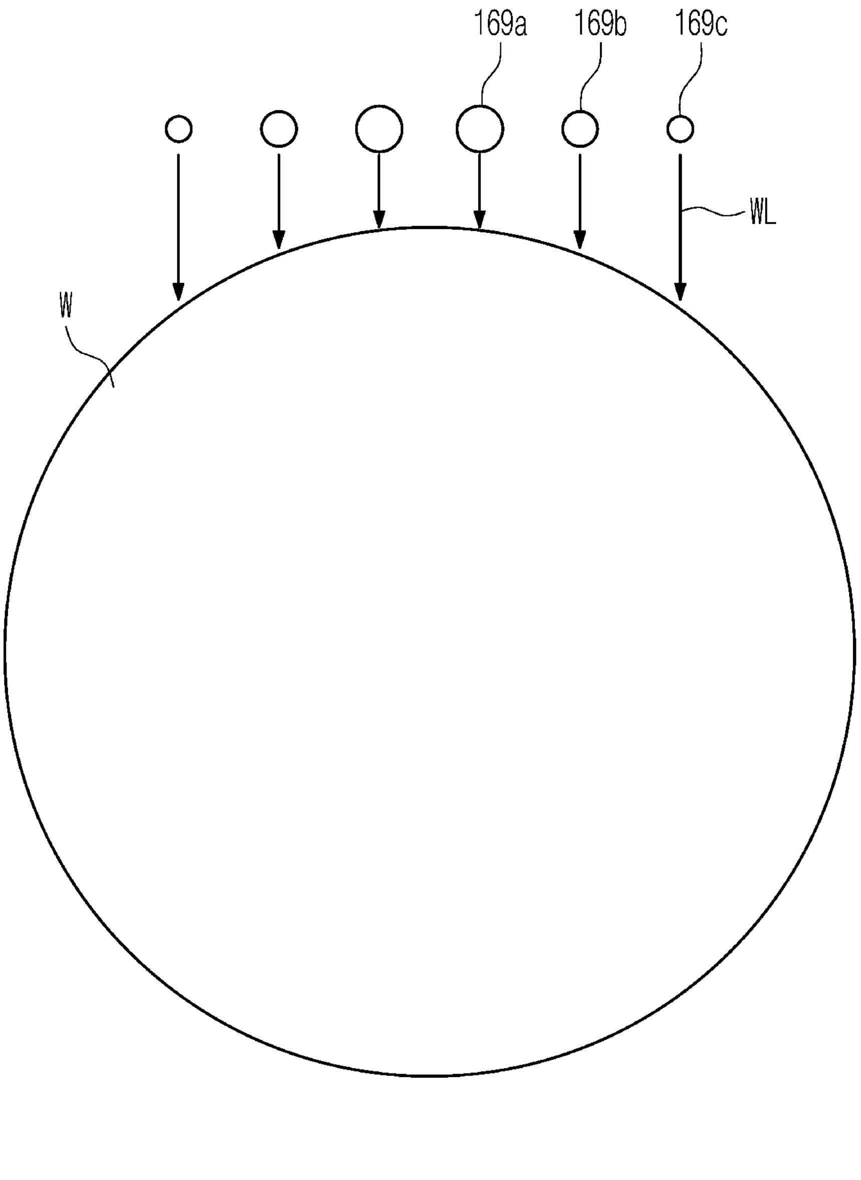
FIG. 21 is a top view illustrating the liquid supply member of FIG. 20 supplying the wetting liquid to the substrate.

In the above-described example, the liquid supply member 168 may be installed on the support body 161 as an example, but the inventive concept is not limited thereto. For example, as shown in FIG. 20, the liquid supply member 169 may be installed on the fastening body 166. The liquid supply member 169 may be a supply pipe in which a first nozzle 169*a*, a second nozzle 168*b*, and a third nozzle 168*c* are formed. The first nozzle 169*a*, the second nozzle 168*b*, and the third nozzle 168*c* may spray the wetting liquid W toward the substrate Win a downwardly inclined direction. At least one of each of the first nozzle 169*a*, the second nozzle 168*b*, and the third nozzle 168*c* may be formed. For example, a plurality of first nozzles 169*a*, second nozzles 168*b*, and third nozzles 168*c* may be formed. The first nozzles 169*a* may be disposed between the second nozzles 169*b*, and the second nozzles 169*b* may be disposed between the third nozzles 169*c*. The first nozzles 169*a* may be disposed relatively inward, and the third nozzles 169*c* may be disposed relatively outward. Also, as illustrated in FIG. 21, diameters of spray holes of the first nozzle 169*a*, the second nozzle 169*b*, and the third nozzle 169*c* may be different from each other. A diameter of a spray hole of the first nozzle 169*a* may be larger than that of the second nozzle 169*b*, and the diameter of the spray hole of the second nozzle 169*b* may be larger than that of the third nozzle 168*c*. In addition, supply flow rates of the wetting liquid WL per unit time transferred to the first nozzle 169*a*, the second nozzle 169*b*, and the third nozzle 169*c* may be the same. Accordingly, a spray distance of the wetting liquid WL supplied from the first nozzle 169*a*, the second nozzle 169*b*, and the third nozzle 169*c* may be the shortest in the first nozzle 169*a* and the longest in the third nozzle 169*c*. In addition, the first nozzle 169*a*, the second nozzle 169*b*, and the third nozzle 169*c* may supply the wetting liquid W to an edge region of the substrate W.

Figure 22:
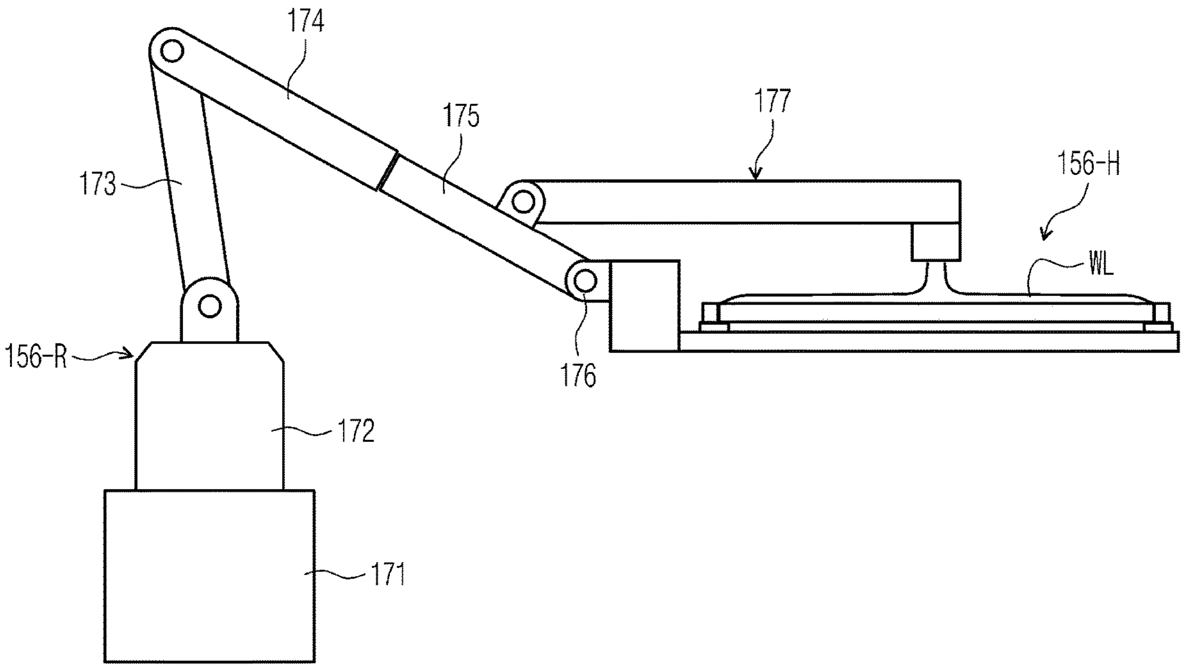
FIG. 22 illustrates the posture change robot according to another embodiment of the inventive concept.

In the aforementioned example, the posture change robot 156 supplying the wetting liquid W to the edge region of the substrate W has been described as an example, but is not limited thereto. For example, as shown in FIG. 22, the liquid supply member 177 may be fastened to the third arm 175. In addition, the liquid supply member 177 may be rotatably provided in a direction parallel to a direction in which the fourth arm 176 rotates as a rotation axis, and may be configured to supply the wetting liquid WL to the center region of the substrate W placed on the hand 156-H.

In the aforementioned example, it has been described that the buffer chamber 210 and the single-type liquid treating chamber 230 have different liquid treating structures, but the inventive concept is not limited thereto. For example, the single-type liquid treating chamber 230 may have the same liquid treatment structure as the buffer chamber 210.

In addition, in the aforementioned example, the first liquid supply unit 320 of the buffer chamber 210 supplies water to the top surface of the substrate W, but is not limited to it. For example, the first liquid supply unit 320 of the buffer chamber 210 may be configured to supply an IPA in the same manner as the second liquid supply unit 330. In this case, if all of the single-type liquid treating chambers 230 are performing a liquid treatment on the substrate W, the buffer chamber 210 may supply the IPA to the top surface of the substrate W, and the substrate W may be transferred directly from the buffer chamber 210 to the single-type drying chamber 240.

Figure 23:
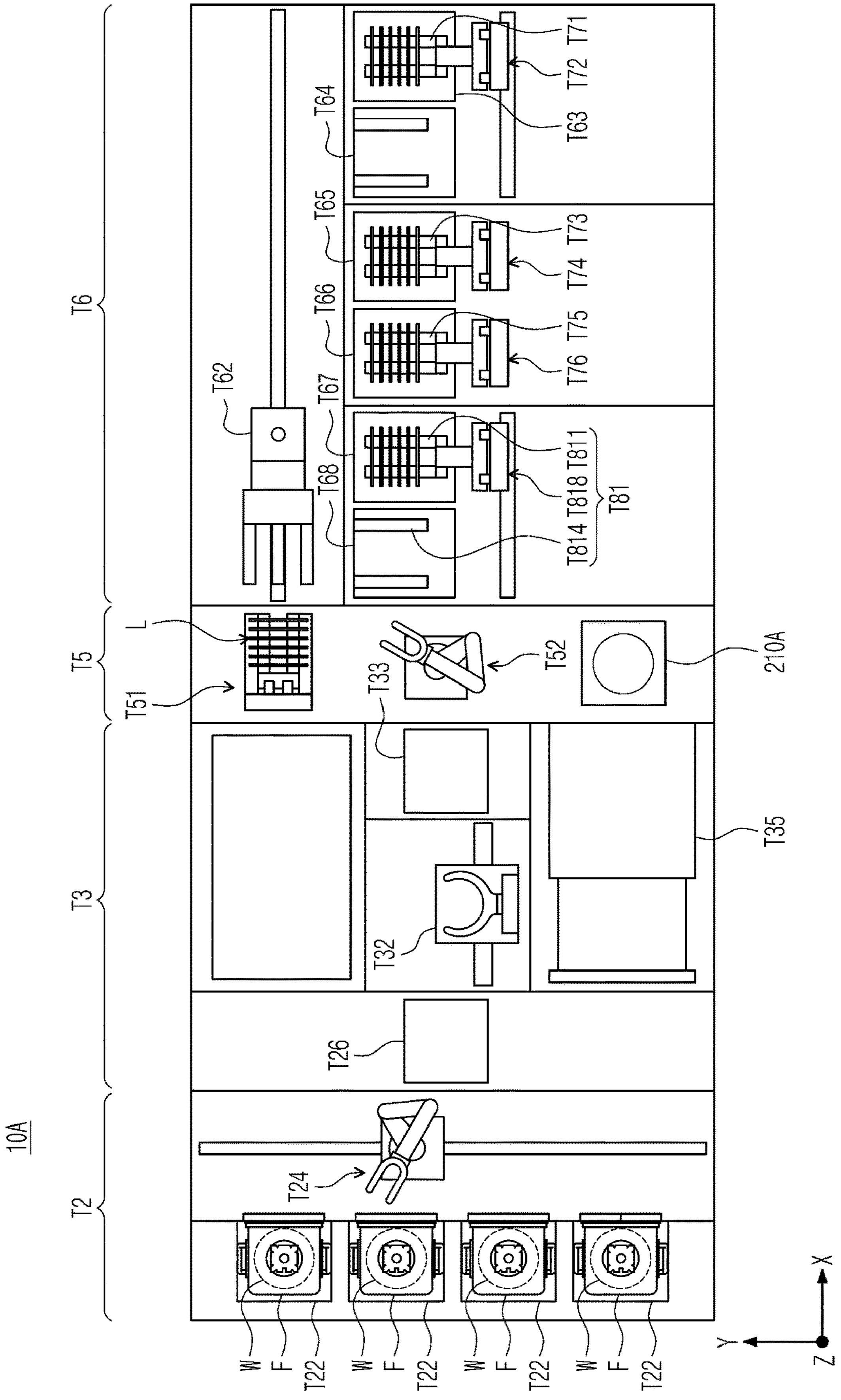
FIG. 23 is a schematic view of the substrate treating apparatus according to another embodiment of the inventive concept as viewed from above.

FIG. 23 is a schematic view of the substrate treating apparatus according to another embodiment of the inventive concept as viewed from above. Referring to FIG. 23, the substrate treating apparatus 10A may include a taking-in/out part T2, a single-type treating part T3, an interface part T5, and a batch-type treating part T6. The taking-in/out part T2 has a loading table T22 for loading the container F. The taking-in/out part T2, the single-type treating part T3, the interface part T5, and the batch-type treating part T6 may be arranged side by side in the first direction TX.

The taking-in/out part T2 may have a first transfer region T23, and the first transfer region T23 may be adjacent to the loading table T22. A first transfer device T24 may transfer the substrate W between the container F and the first buffer unit T26.

The single-treating part T3 may have a second transfer region T31, and the second transfer region T31 may be adjacent to the first buffer unit T26. A second transfer device T32 may be installed in the second transfer region T31. The second transfer device T32 may take out the substrate TW from the first buffer unit T26 and take the substrate TW into the second buffer unit T33. A single-type liquid treating chamber T34 may be disposed on a side of the first transfer device T32, and a single-type drying chamber T35 may be disposed on the other side.

The interface unit T5 may include a lot forming unit T51, a transfer unit T52, and a buffer chamber 210A. The buffer chamber 210A may have the same structure as the buffer chamber 210 described above. The transfer unit T52 may transfer the substrate TW transferred to the second buffer unit T33 to the lot forming unit T51, and may also transfer the substrate TW treated by the batch-type treating part T6 to the single-type liquid treating chamber T34.

The batch-type treating part T6 has a third transfer region T61, and the third transfer region T61 is adjacent to the interface unit T5. A third transfer device T62 is provided in the third transfer region T61, and the substrate TW may be transferred between devices adjacent to the third transfer region T61. The third transfer device may collectively transfer a plurality of substrates.

A first chemical bath T63, a first rinsing liquid bath T64, a second chemical bath T65, a second rinsing liquid bath T66, a third chemical bath T67, and a third rinsing liquid bath T68 may be adjacent to the batch-type treating part T6.

In the first chemical bath T63, a natural oxide film may be removed using a DHF (dilute hydrofluoric acid) or a BHF (a mixture of a hydrofluoric acid and an ammonium fluoride). In the first rinsing liquid bath T64, the substrate TW may be treated using a deionized water. In the second chemical bath T65, a silicon nitride layer among a silicon oxide layer and the silicon nitride layer may be selectively etched using a phosphoric acid aqueous solution. The second rinsing liquid bath T66 may treat the substrate TW using a deionized water. In the third chemical bath T67, the substrate TW may be treated using a SC1 (a mixture of an ammonia, a hydrogen peroxide, and a water), and in the third rinsing liquid bath T68, the substrate TW may be treated using the deionized water.

In addition, the batch-type treating part T6 may include a first support member T71, a first driving member T72, a second support member T73, a second driving member T74, a third support member T75, a third driving member T763, a fourth support member T811, and a fourth driving member T818. In addition, a fifth support member T814 may be installed in the third rinsing liquid bath T68.

The substrate TW immersed in the third rinsing liquid bath T68 of the batch-type treating part T6 may be taken out by the transfer unit T52 and taken into the buffer chamber 210A. The buffer chamber 210A may supply a first liquid (water) to the top surface of the substrate TW and the second liquid (IPA) to the bottom surface of the substrate TW. The transfer unit T52 may have the same and similar structure as the first transfer robot T222 described above.

Figure 24:
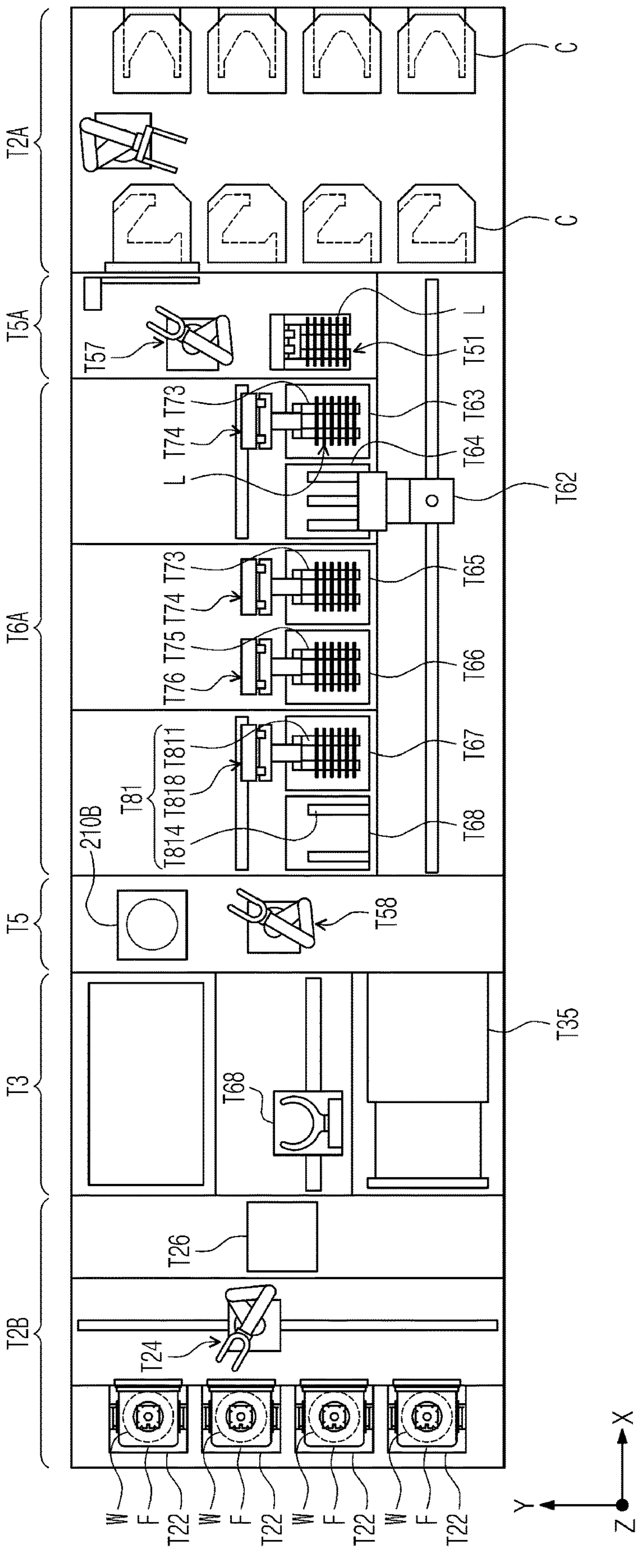
FIG. 24 is a schematic view of the substrate treating apparatus according to another embodiment of the inventive concept as viewed from above.

FIG. 24 is a top view of the substrate treating apparatus according to another embodiment of the inventive concept. Referring to FIG. 24, the substrate treating apparatus T10B according to another embodiment of the inventive concept has a difference from the embodiment of FIG. 23 in that the taking-in part T2A to which the substrate TW is taken in and the taking-out part T2B to which the substrate TW is taken out are distinguished. An untreated substrate TW taken into the taking-in part T2A may be transferred to the lot L by a transfer mechanism T57 of an additional interface unit T5, treated in the batch-type treating unit T6A, and then taken into the buffer chamber 210B by the transfer robot T58. The buffer chamber 210B may have the same or similar structure as the buffer chambers 210 and 210A described above.

Figure 25:
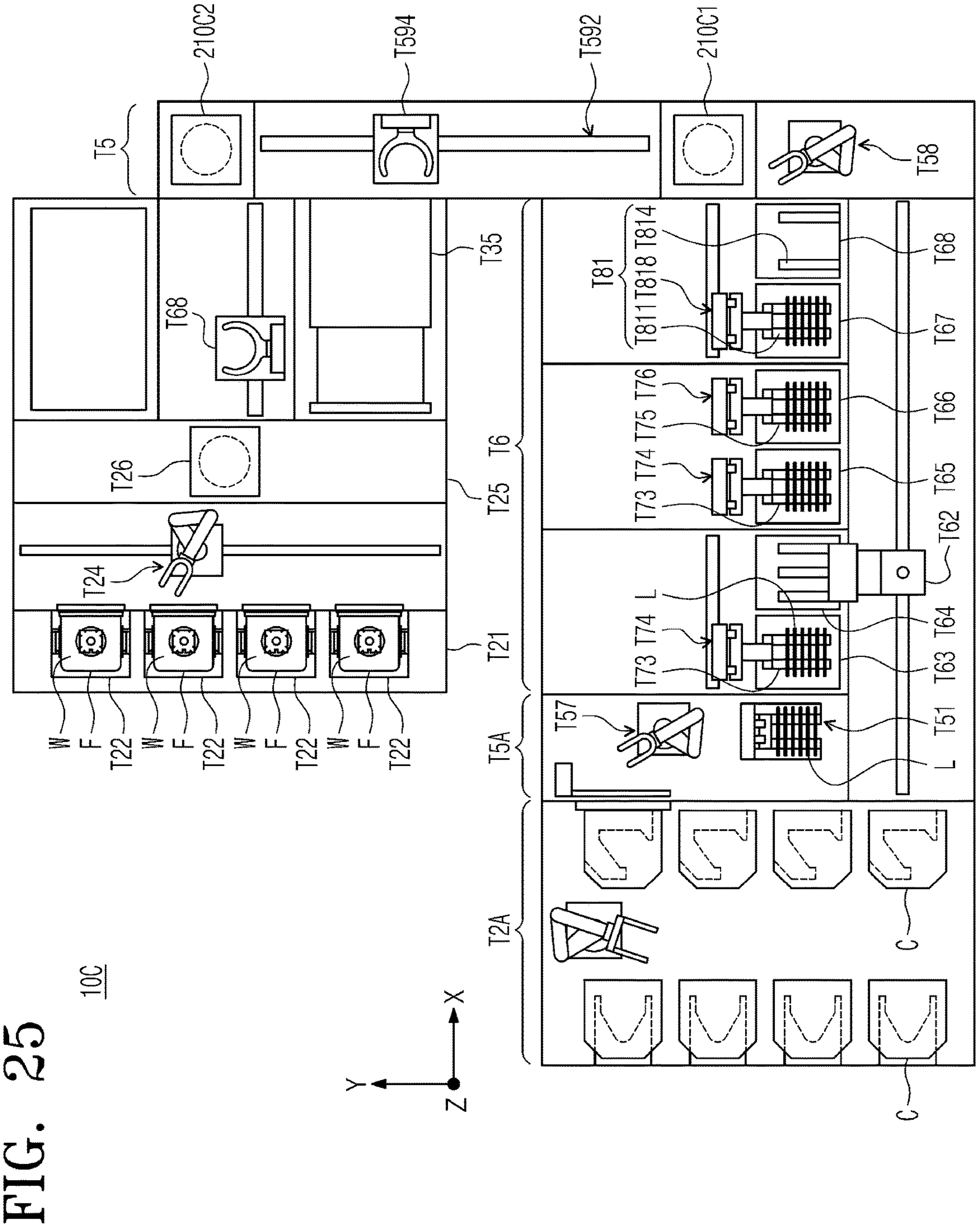
FIG. 25 is a schematic view of the substrate treating apparatus according to another embodiment of the inventive concept as viewed from above.

FIG. 25 is a top view of the substrate treating apparatus according to another embodiment of the inventive concept. Referring to FIG. 25, the substrate treating apparatus T10C according to another embodiment of the inventive concept is different from the embodiment of FIG. 24 in that a plurality of buffer chambers 210C1 and 210C2 are provided. The substrate TW taken out of the batch-type treating part T6 by the transfer robot T58 may be transferred to a first buffer chamber 210C1, and then taken into a second buffer chamber 210C2 by the transfer rail T592 and the transfer hand T594. The substrate TW taken into the second buffer chamber 210C2 may be taken into the single-type liquid treating chamber T34 by the transfer robot T68.

Figure 26:
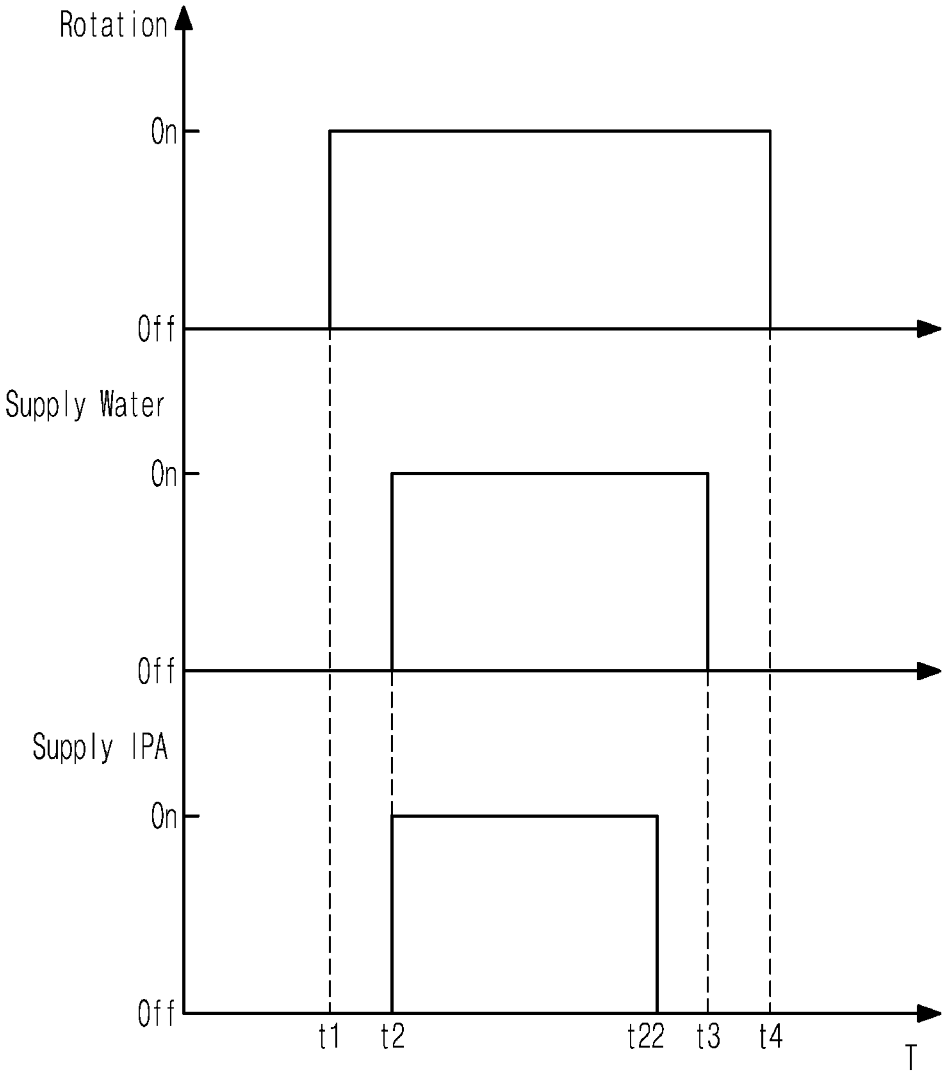
FIG. 26 is a graph schematically illustrating another embodiment of supply on and off times of the first liquid and the second liquid supplied to the substrate when performing the second wetting step of FIG. 17.
Figure 27:
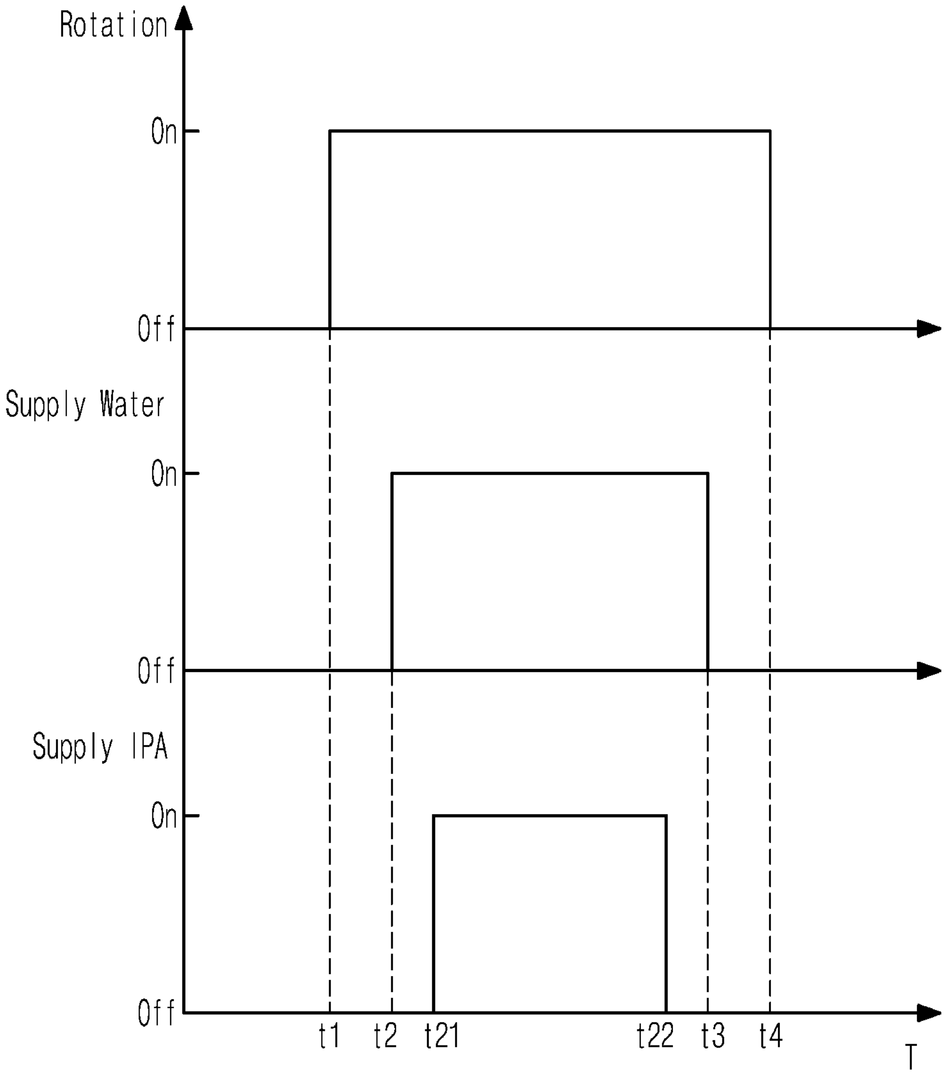
FIG. 27 is a graph schematically illustrating another embodiment of supply on and off times of the first liquid and the second liquid supplied to the substrate when performing the second wetting step of FIG. 17.

In the above-described example, as shown in FIG. 18, the first liquid and the second liquid are supplied at the same time, or as shown in FIG. 19, a supply of the second liquid is started after a predetermined time elapses after a supply of the first liquid is started, but the above-described example is not limited thereto. For example, as shown in FIG. 26, the supply of the first liquid and the second liquid is started at the same time, but an end time point of the supply of the second liquid may be faster than an end time point of the supply of the first liquid. Since the second liquid, which may be an IPA, is sufficient to clean and dry the bottom surface of the substrate W, a problem of wasting the second liquid may be minimized by making the end time point of the supply of the second liquid faster. Also, as shown in FIG. 27, a start time point of the supply of the second liquid may be later than a start time point of the supply of the first liquid, and the end time point of the supply of the second liquid may be earlier than the end time point of the supply of the first liquid. Likewise, since the second liquid, which may be an IPA, is sufficient to wash and dry the bottom surface of the substrate W, a problem of wasting the second liquid may be minimized by making the end time point of the supply of the second liquid faster and delaying the start time point of the supply of the first liquid.

In addition, the top surface of the substrate W described above may be a pattern surface on which a pattern may be formed, and may be referred to as a first surface. In addition, the bottom surface of the substrate W described above may be a non-pattern surface on which the pattern is not formed, and may be referred to as a second surface.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating apparatus comprising:
- a batch-type treating bath for treating a substrate in a batch-type manner;
- a single-type treating chamber for treating the substrate in a single-type manner; and
- a buffer chamber positioned at a transfer path of the substrate transferred between the batch-type treating bath and the single-type treating chamber, and configured to supply a liquid to the substrate for maintaining a wetting state of the substrate, wherein the buffer chamber includes:
- a chuck for supporting and rotating the substrate; and
- a liquid supply unit for supplying the liquid to the substrate supported and rotated on the chuck.

2. The substrate treating apparatus of claim 1, wherein the liquid supply unit includes:
- a first liquid supply unit configured to supply a first liquid to a top surface of the substrate supported on the chuck; and
- a second liquid supply unit configured to supply a second liquid to a bottom surface of the substrate supported on the chuck.

3. The substrate treating apparatus of claim 2, wherein the second liquid supply unit is configured to supply the second liquid which has a higher volatility than the first liquid supplied by the first liquid supply unit.

4. The substrate treating apparatus of claim 3, wherein the second liquid supply unit is configured to supply the second liquid which is an isopropyl alcohol (IPA).

5. The substrate treating apparatus of claim 4, wherein the first liquid supply unit is configured to supply the first liquid which is a water.

6. The substrate treating apparatus of claim 3, further comprising:
- a controller configured to control the buffer chamber and configured to control the buffer chamber such that a rotation speed of the chuck is selected from a range of 300 RPM to 500 RPM during a time when the liquid is supplied from the liquid supply unit.

7. The substrate treating apparatus of claim 3, further comprising:
- a controller configured to control the buffer chamber and the single-type treating chamber such that a treating time of the substrate in the buffer chamber is shorter than a treating time of the substrate in the single-type treating chamber.

8. The substrate treating apparatus of claim 1, further comprising:
- a posture change treating bath positioned between the batch-type treating bath and the buffer chamber, wherein a liquid stored in the posture change treating bath is a liquid which is the same as a liquid supplied by the liquid supply unit.

9. The substrate treating apparatus of claim 1, further comprising:
- a transfer robot for transferring the substrate in the single-type treating chamber, wherein the single-type treating chamber includes:
- a single-type liquid treating chamber for treating the substrate by supplying a treating liquid to the substrate; and
- a single-type drying chamber for dry treating the substrate, and wherein the transfer robot transfers the substrate among the single-type liquid treating chamber, the single-type drying chamber, and the buffer chamber.

10. The substrate treating apparatus of claim 9, wherein the transfer robot includes:
- a first hand;
- a second hand installed at a height lower than the first hand; and
- a third hand installed at a height lower than the second hand.

11. The substrate treating apparatus of claim 10, further comprising:
- a controller configured to control the transfer robot such that the first hand is used while transferring the substrate which is dry treated at the single-type drying chamber, the third hand is used while transferring the substrate which is wetted at the buffer chamber, and the second hand is used while transferring the substrate from the single-type liquid treating chamber to the single-type drying chamber.

12. The substrate treating apparatus of claim 3, further comprising:

a controller configured to control the buffer chamber such that a supply of the first liquid is started from the first liquid supply unit, and after a set time passes, a supply of the second liquid is started from the second liquid supply unit.

* * * * *